US012172290B2

(12) United States Patent
Miyazawa et al.

(10) Patent No.: US 12,172,290 B2
(45) Date of Patent: Dec. 24, 2024

(54) WORK TOOL

(71) Applicant: KOKI HOLDINGS CO., LTD., Tokyo (JP)

(72) Inventors: Ken Miyazawa, Ibaraki (JP); Ryo Suzuki, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 214 days.

(21) Appl. No.: 17/789,455

(22) PCT Filed: Nov. 30, 2020

(86) PCT No.: PCT/JP2020/044490
§ 371 (c)(1),
(2) Date: Jun. 27, 2022

(87) PCT Pub. No.: WO2021/131510
PCT Pub. Date: Jul. 1, 2021

(65) Prior Publication Data

US 2023/0044008 A1 Feb. 9, 2023

(30) Foreign Application Priority Data

Dec. 27, 2019 (JP) ................................ 2019-239450

(51) Int. Cl.
*B25F 5/02* (2006.01)
*B24B 23/02* (2006.01)

(52) U.S. Cl.
CPC .............. *B25F 5/02* (2013.01); *B24B 23/028* (2013.01)

(58) Field of Classification Search
CPC ................................ B25F 5/02; B24B 43/028
See application file for complete search history.

(56) References Cited

U.S. PATENT DOCUMENTS 3,847,233 A * 11/1974 Glover ..................... H01H 3/20 200/318.2
4,381,037 A * 4/1983 Cuneo ....................... B25F 5/02 200/321

(Continued)

FOREIGN PATENT DOCUMENTS

CN 104626032 A 5/2015
CN 107306107 A 10/2017

(Continued)

OTHER PUBLICATIONS

International Preliminary Report on Patentability issued Jun. 28, 2022 by the International Searching Authority (Japan Patent Office) in PCT Application PCT/JP2020/044490 (English Translation).

(Continued)

*Primary Examiner* — Lucas E. A. Palmer
(74) *Attorney, Agent, or Firm* — NovoTechIP International PLLC

(57) ABSTRACT

A work tool includes: a motor; a housing including a gripping part; an electronic switch; a controller controlling the motor based on a signal from the switch; an operating part provided at the gripping part; and an intervening part movably intervened between the operating part and the switch. The switch is provided at the housing at a first position in an axial direction of the gripping part, and is switchable between an ON position for driving the motor and an OFF position for stopping the motor. A direction connecting the ON position and the OFF position to each other is a crossing direction crossing the axial direction. The operating part is movable in the crossing direction to drive and stop the motor. The intervening part transmits movement to the switch by a moving amount smaller than movement in the crossing direction of the operating part passing through the first position.

17 Claims, 15 Drawing Sheets

(56) References Cited

U.S. PATENT DOCUMENTS

| | | | | |
|---|---|---|---|---|
| 7,722,444 | B2 * | 5/2010 | Gallagher | B24B 45/006 451/344 |
| 9,123,478 | B2 * | 9/2015 | Esenwein | H01H 9/00 |
| 2005/0205406 | A1 * | 9/2005 | Wong | H01H 9/06 200/522 |
| 2010/0018734 | A1 * | 1/2010 | Frauhammer | B25D 16/006 200/332 |
| 2010/0175972 | A1 * | 7/2010 | Kimata | H01H 9/282 200/318.1 |
| 2011/0168422 | A1 * | 7/2011 | Fujiwara | B24B 23/028 173/217 |
| 2011/0203826 | A1 * | 8/2011 | Hosokawa | B24B 23/02 173/217 |
| 2011/0227429 | A1 * | 9/2011 | Takeda | B24B 55/052 310/50 |
| 2013/0023189 | A1 * | 1/2013 | Numata | B23Q 11/0092 451/344 |
| 2013/0081287 | A1 * | 4/2013 | Moreno | B27B 9/02 30/390 |
| 2013/0140051 | A1 * | 6/2013 | Rudolph | B27B 17/083 173/18 |
| 2014/0054146 | A1 * | 2/2014 | Hiller | B24B 23/028 200/329 |
| 2015/0087211 | A1 * | 3/2015 | Baykara | B24B 47/26 188/74 |
| 2015/0122523 | A1 | 5/2015 | Yamamoto et al. | |
| 2017/0125192 | A1 * | 5/2017 | Hanai | H01H 21/00 |
| 2017/0136614 | A1 * | 5/2017 | Takeda | B25F 5/008 |
| 2017/0250038 | A1 * | 8/2017 | Esenwein | B25F 5/00 |
| 2017/0304976 | A1 | 10/2017 | Nakamoto | |
| 2019/0198270 | A1 * | 6/2019 | Wong | H01H 19/635 |
| 2020/0086455 | A1 | 3/2020 | Iwakami et al. | |

FOREIGN PATENT DOCUMENTS

| | | | | |
|---|---|---|---|---|
| CN | 110177659 | A | 8/2019 | |
| JP | 2011167812 | A | 9/2011 | |
| JP | 2011177812 | A | 9/2011 | |
| JP | 2014124728 | A | 7/2014 | |
| TW | 201600238 | A | 1/2016 | |
| WO | 9938631 | A1 | 8/1999 | |
| WO | 2017222049 | A1 | 12/2017 | |
| WO | WO-2018131293 | A1 * | 7/2018 | B24B 23/02 |

OTHER PUBLICATIONS

International Search Report and Written Opinion issued Jan. 19, 2021 by the International Searching Authority (Japan Patent Office) in PCT Application PCT/JP2020/044490 (Partial English Translation).

Office Action for Chinese Application No. 2020800904885, dated Mar. 18, 2024, 14 pages (machine-generated English translation).

* cited by examiner

WORK TOOL

TECHNICAL FIELD

The present invention relates to a work tool.

BACKGROUND ART

Conventionally, electric work tools capable of driving or stopping a motor in response to an operator's operations on a lever provided on a housing have been widely known. Patent Literature 1 discloses, as an example of such a work tool, an electric grinder having a switch lever and a switch.

With the electric grinder of Patent Literature 1, the operator presses the switch lever into a housing. At this time, a push bar provided on the switch lever presses a protruding part on the switch upward, whereby electric power from a commercial power supply is supplied to a motor.

CITATION LIST

Patent Literature

PTL1: Japanese Patent Application Publication No. 2011-167812

SUMMARY OF INVENTION

Technical Problem

With a configuration in Patent Literature 1, the switch lever needs to be pivotally moved by a large amount relative to the housing so that the operator can feel that the switch lever is pressed inward. However, the switch lever is allowed to be moved by only a small amount when turning on the switch (when the switch lever contacts the protruding part and presses the protruding part upward in a case of Patent Literature 1). Therefore, the switch must be disposed at the downstream end on a pivot path of the switch lever, which reduces freedom in arranging the switch inside the housing.

In view of the foregoing, it is an object of the present invention to provide a work tool that can facilitate the arrangement of a switch in a housing when a lever-type operating part for driving a motor is provided.

Solution to Problem

In order to attain the above and other objects, the present invention provides a work tool including: a motor; a housing accommodating therein the motor, the housing including a gripping part that can be gripped by an operator; an electronic switch, the switch being provided at the housing at a first position in an axial direction of the gripping part, the switch being switchable between an ON position for driving the motor and an OFF position for stopping the motor, a direction connecting the ON position and the OFF position to each other being a direction crossing the axial direction; a controller controlling the motor on a basis of a signal from the switch; an operating part provided at the gripping part, the operating part being movable in the crossing direction in order to drive and stop the motor; and an intervening part movably intervened between the operating part and the switch, the intervening part transmitting movement to the switch by a moving amount smaller than movement in the crossing direction of the operating part passing through the first position.

According to the work tool with the above configuration, since the intervening part is intervened between the switch and the operating part, movement of the operating part at the first position can be converted to small movement of the intervening part and transmitted to the switch. Accordingly, the switch need not be provided at the downstream end of a pivot path of the operating part even when the operating part is configured to be pivotally moved relative to the housing by a large amount such that an operator can feel that a switch lever is pressed inward, thereby securing freedom in arrangement of the switch inside the housing.

In the above configuration, it is preferable that: the intervening part includes: a lever; and a pivot shaft supported by the housing and supporting the lever such that the lever is pivotally movable relative to the housing; movement of the operating part is transmitted to the lever by contact of the operating part with the lever at a second position in the axial direction; and the first position is positioned between the second position and the pivot shaft.

This can suitably attain a configuration in which movement of the operating part at the first position can be converted to small movement of the intervening part and transmitted to the switch.

Further, it is preferable that: the operating part includes a support shaft rotatably supported by the housing, the operating part being configured to be pivotally movable about the support shaft; and the second position is positioned between the first position and the support shaft in the axial direction.

This can also suitably attain a configuration in which movement of the operating part at the first position can be converted to small movement of the intervening part and transmitted to the switch.

Further, it is preferable that the intervening part is configured to be movable between a pressed position where the intervening part presses the switch such that the switch is at the ON position and a release position where the intervening part is positioned away from the switch, the intervening part being configured to be moved from the pressed position to the release position upon transmission of movement in the crossing direction of the operating part to the intervening part.

With this configuration, the motor can be suitably stopped since the intervening part is configured to be moved from the pressed position to the release position in response to the operator releasing operation on the operating part.

Further, it is preferable that: the intervening part and the operating part are configured to be engageable with each other; and operation in a direction for driving the motor and operation in a direction for stopping the motor in the crossing direction of the operating part are configured to be transmitted to the intervening part.

With this configuration, the motor can be suitably driven or stopped in response to the operator's operations on the operating part in a configuration in which the switch is turned on and off via the intervening part.

Further, it is preferable that an urging member is provided between the operating part and the housing to urge the operating part such that the intervening part is moved from the pressed position to the release position.

With this configuration, the intervening part can be moved from the pressed position to the release position through a simple configuration.

Further, it is preferable that: the work tool further includes: a first urging member provided between the intervening part and the switch to urge the intervening part to be moved from the pressed position to the release position; and a second urging member provided between the operating part and the housing to urge the operating part; and the intervening part is configured to be moved to the release position in accordance with movement of the operating part caused by application of an urging force by the second urging member.

With this configuration, the intervening part can be moved from the pressed position to the release position through a simple configuration. Further, if the first urging member is deteriorated, the urging force of the second urging member urging the operating part can move the intervening part to the release position.

Further, it is preferable that: the housing includes: a motor housing accommodating therein the motor; and a rear housing accommodating therein the switch; and the operating part is supported by the rear housing, and the intervening part is supported by the motor housing.

With this configuration, the intervening part is supported by the motor housing accommodating the motor therein. Therefore, a mechanism for supporting the intervening part need not be provided in the rear housing. As a consequence, a space for accommodating the switch can be easily secured in the rear housing when providing the switch in the rear housing.

Further, it is preferable that: the motor housing is formed through integral molding to have a cylindrical shape; the intervening part includes: a lever; a pivot shaft supported by the housing and supporting the lever such that the lever is pivotally movable relative to the housing; and a support part supporting the lever and the pivot shaft; and the intervening part is supported by the motor housing by attachment of the support part to the motor housing.

With this configuration, since the support part is attached to the motor housing to allow the intervening part to be supported by the motor housing, there is no need to provide a threaded boss for fastening the intervening part to the motor housing formed into a cylindrical shape, thereby avoiding an increase in an external size of the motor housing.

Further, it is preferable that: the motor includes a rotation axis; a holding part is provided at the motor housing, the holding part being positioned inside the motor housing and holding a bearing supporting the rotation axis; and the support part is held by the holding part.

With this configuration, the intervening part can be supported by the motor housing through a simple configuration.

Further, it is preferable that: an intake port through which air for cooling the controller is introduced is formed in the rear housing; and the switch and the intervening part are disposed at positions close to an inner surface of the rear housing.

With this configuration, since the intervening part is provided at a position close to the inner surface of the rear housing, the intervening part can be restrained from blocking cooling air introduced through intake port formed in the rear housing, thereby improving cooling efficiency.

Further, it is preferable that: the controller includes an inverter circuit including a plurality of switching elements for controlling the motor; and the intervening part and the inverter circuit are positioned at positions the same as each other in the axial direction.

With this configuration, the intervening part is not positioned upstream of the inverter circuit along a path of cooling air when the path extends in the axial direction of the gripping part. Therefore, the intervening part does not block cooling air on the upstream side of the inverter circuit, thereby improving cooling efficiency for the inverter circuit.

The present invention also provides a work tool including: a motor; a housing accommodating therein the motor; a switch switchable between an ON position for driving the motor and an OFF position for stopping the motor; an operating part including a support shaft supported by the housing, the operating part being pivotally movable relative to the housing about the support shaft in a first direction; and an intervening part intervened between the operating part and the switch, the intervening part including a pivot shaft supported by the housing, the intervening part being pivotally movable relative to the housing about the pivot shaft in a second direction opposite the first direction, the intervening part being capable of pressing the switch by pivotal movement of the intervening part relative to the housing in the second direction, and a contact part is provided at the operating part, the contact part being positioned closer to the support shaft than the switch is to the support shaft and capable of contacting the intervening part, the intervening part causing the switch to be moved to the ON position by the contact part pressing the intervening part in accordance with pivotal movement of the operating part.

According to the work tool with the above configuration, since movement of the operating part at the first position can be converted to small movement of the intervening part and transmitted to the switch, the switch need not be provided at the downstream end of a pivot path of the operating part even when the operating part is configured to be pivotally moved relative to the housing by a large amount such that an operator can feel that a switch lever is pressed inward, whereby freedom in arrangement of the switch inside the housing can be secured.

The present invention also provides a work tool including: a motor; a housing accommodating therein the motor, the housing including a gripping part that can be gripped by an operator and extending in a prescribed direction; a switch switchable between an ON position for driving the motor and an OFF position for stopping the motor, a direction connecting the ON position and the OFF position to each other being a direction crossing the prescribed direction; an operating part provided at the gripping part, the operating part being movable in the crossing direction in order to drive and stop the motor; and an intervening part movably intervened between the operating part and the switch, and the intervening part is configured to be movable between a pressed position where the intervening part presses the switch such that the switch is at the ON position and a release position where the intervening part is positioned away from the switch, the intervening part being configured to be moved from the pressed position to the release position upon transmission of movement in the crossing direction of the operating part to the intervening part.

According to the work tool with the above configuration, since the intervening part is configured to be moved from the pressed position to the release position in response to the operator releasing the operation to the operating part, the motor can be suitably stopped.

The present invention also provides a work tool including: a motor; a housing accommodating the motor, the housing including a gripping part that can be gripped by an operator; an operating part provided at the gripping part, the operating part being movable in a prescribed direction crossing an axial direction of the gripping part relative to the housing in order to drive and stop the motor; an intervening part movable between a motor drive position and a motor stop position relative to the housing in accordance with movement of the operating part; and a switch including a detection part positioned at a prescribed position in the axial direction of the gripping part to detect a position of the intervening part relative to the housing, the switch controlling the motor to be driven when the detection part detects that the intervening part is at the motor drive position, the switch controlling the motor to be stopped when the detection part detects that the intervening part is at the motor stop position, and the intervening part is movable from the motor stop position to the motor drive position in the prescribed direction passing through the prescribed position by a moving amount smaller than movement of the operating part.

According to the work tool with the above configuration, since movement of the operating part at the first position can be converted to small movement of the intervening part and transmitted to the switch, the switch need not be provided at the downstream end of a pivot path of the operating part even when the operating part is configured to be pivotally moved relative to the housing by a large amount such that an operator can feel that a switch lever is pressed inward. Accordingly, freedom in arrangement of the switch inside the housing can be secured.

Advantageous Effects of Invention

According to the work tool of the present invention, the arrangement of the switch in the housing can be facilitated even when the lever-type operating part for driving the motor is provided.

DESCRIPTION OF EMBODIMENTS

Figure 1:
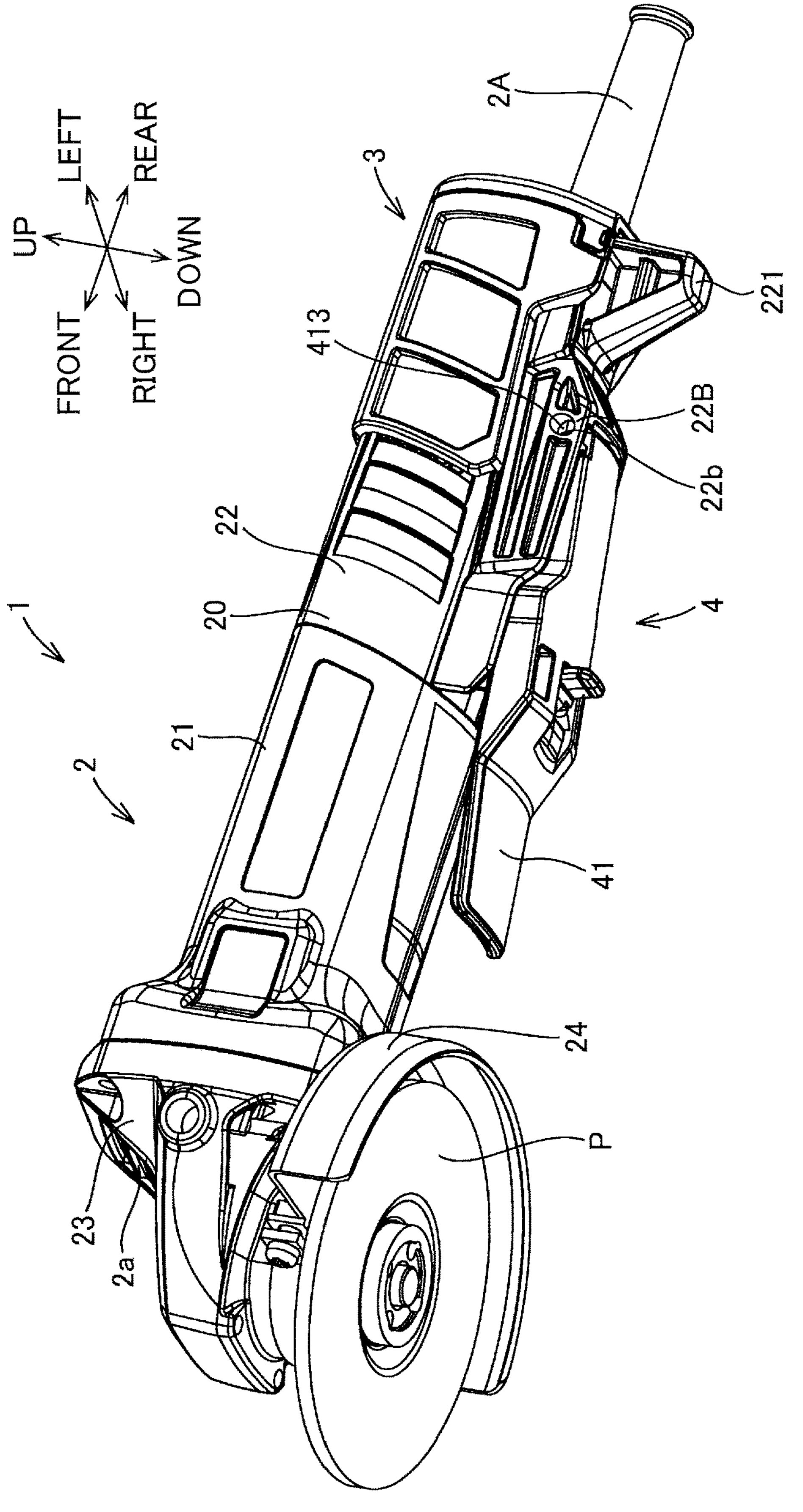
FIG. 1 is an external perspective view illustrating a disc grinder according to a first embodiment of the present invention as viewed from the approximate left and lower side thereof.

A disc grinder 1 as an example of a work tool according to a first embodiment of the present invention will be described while referring to FIGS. 1 to 14. The disc grinder 1 is an electric work tool used to grind, cut, and the like workpieces using a disc-shaped end bit tool (such as a grinding wheel).

In the following description, “front”, “rear”, “up”, and “down” appearing in the drawings are used to define a frontward direction, a rearward direction, an upward direction, and a downward direction, respectively. Additionally, “right” and “left” when viewing the disc grinder 1 from the rear side thereof define a rightward direction and a leftward direction, respectively. When dimensions, numerals, and the like are referenced in this specification, the values are intended to include not only dimensions and numerals that correspond exactly to these dimensions, numerals, and the like, but also dimensions, numerals, and the like that approximately correspond (values within a range of manufacturing error, for example). Similarly, terms such as “identical”, “orthogonal”, “parallel”, “correspond”, “flush”, and the like are intended to include the meanings “approximately identical”, “approximately orthogonal”, “approximately parallel”, “approximately correspond”, “approximately flush”, and the like, respectively.

Figure 2:
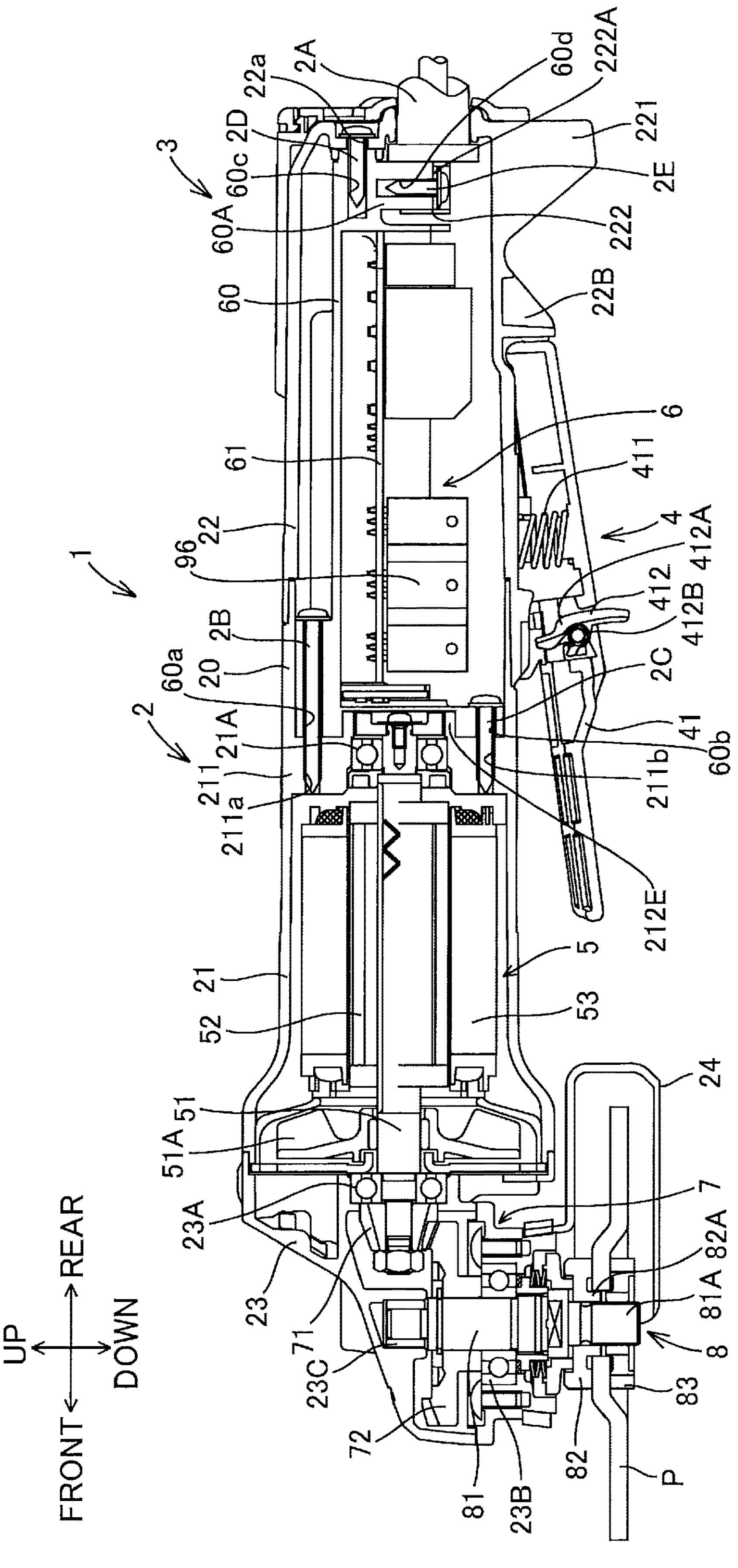
FIG. 2 is an overall cross-sectional view illustrating an internal configuration of the disc grinder according to the first embodiment of the present invention.
Figure 14:
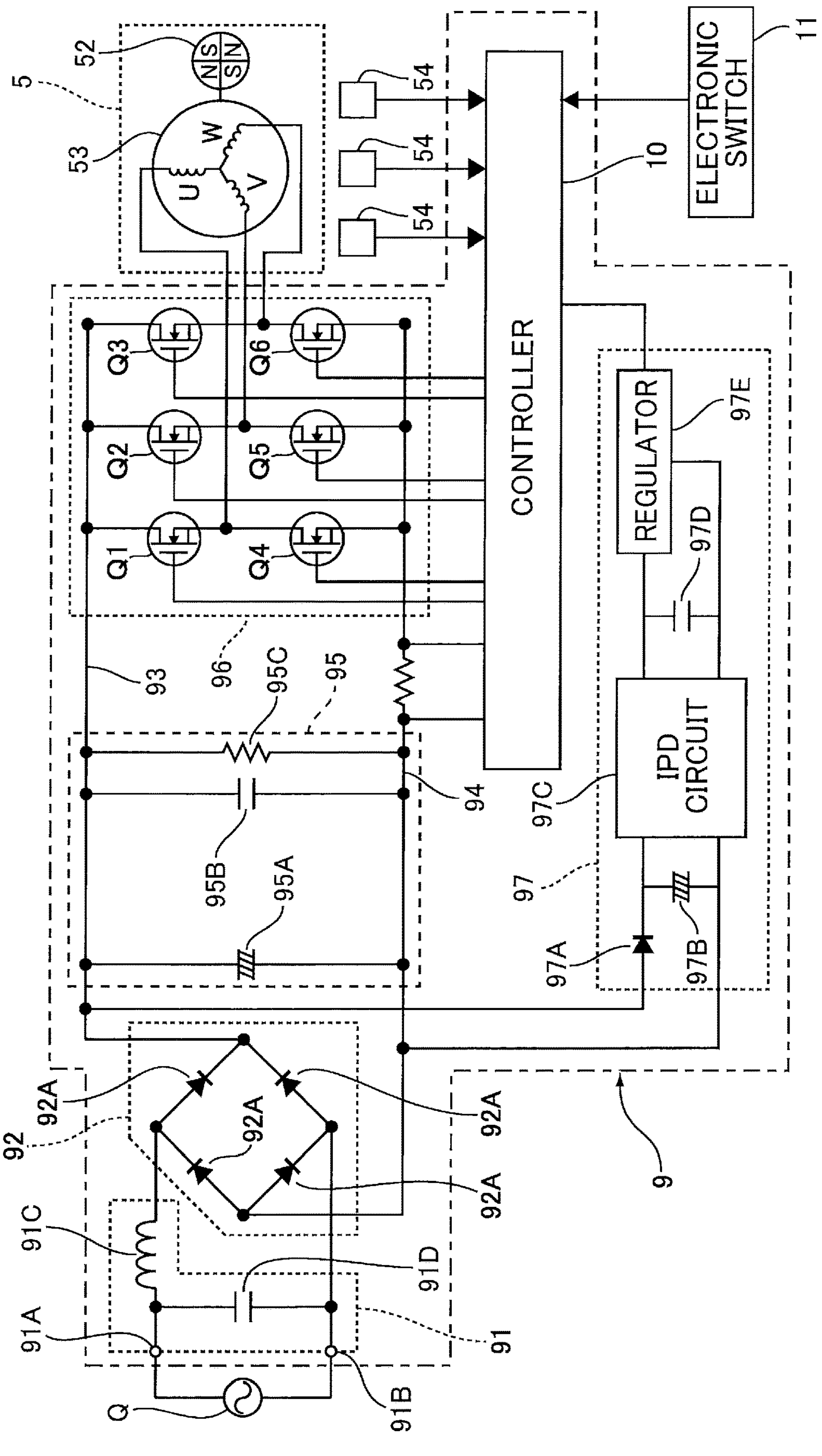
FIG. 14 is a circuit diagram illustrating an electrical configuration in the disc grinder according to the first embodiment of the present invention.

As illustrated in FIGS. 1, 2, and 14, the disc grinder 1 includes a housing 2, a filter part 3, a lever part 4, a motor 5, a circuit board part 6, a power transmission part 7, an output part 8, a power supply circuit 9 (see FIG. 14), a controller 10 (see FIG. 14), and an electronic switch 11 (see FIG. 14). A grinding wheel P as an example of the end bit tool is attachable to and detachable from the output part 8. The electronic switch 11 includes a switch plunger 11A.

As illustrated in FIG. 1, the housing 2 mainly includes a motor housing 21, a tail cover 22, and a gear housing 23. In the present embodiment, the housing 2 is constituted by three components arranged in a front-rear direction, but the housing 2 is not limited to this configuration. For example, the motor housing 21 and the tail cover 22 may be configured single piece structure, or may have another divided configuration. As illustrated in FIG. 2, the housing 2 includes fixing screws 2B, 2C, 2D, and 2E. The housing 2 is an example of the "housing" of the present invention.

The motor housing 21 illustrated in FIGS. 1 and 2 is made of resin or metal, and accommodates the motor 5 therein. The motor housing 21 is configured as a cylindrical housing elongated in the front-rear direction and cannot be divided in a radial direction thereof. A bearing holding part 211 is provided at a rear portion inside the motor housing 21. The motor housing 21 is an example of the "motor housing" of the present invention.

A female threaded hole 211*a* is formed in an upper portion of the bearing holding part 211 to penetrate the bearing holding part 211 in the front-rear direction. A female threaded hole 211*b* is formed in a lower portion of the bearing holding part 211 to penetrate the bearing holding part 211 in the front-rear direction. A through-hole penetrating the bearing holding part 211 in the front-rear direction is also formed in an approximate center portion in a radial direction of the bearing holding part 211, and a ball bearing 21A is provided at an inner surface of the through-hole. A configuration of the motor housing 21 will be described later in greater detail.

The tail cover 22 is made of resin or metal, and accommodates therein the circuit board part 6. The tail cover 22 is configured as a cylindrical housing elongated in the front-rear direction and cannot be divided in a radial direction thereof. The tail cover 22 includes a rear wall formed with a through-hole 22*a* penetrating the rear wall in the front-rear direction. As illustrated in FIG. 2, a protruding part 221, a support part 22B, a power cord 2A, and a base part 60 are provided at the tail cover 22. The protruding part 221 is provided at a rear portion of the tail cover 22, and protrudes downward from an outer circumferential surface of the tail cover 22. The support part 22B is provided at a lower portion of the tail cover 22 and extends in the front-rear direction. As illustrated in FIG. 1, the support part 22B has symmetrically configured wall portions on left and right sides. A through-hole 22*b* is formed in each of the wall portions to penetrate the wall portions in a left-right direction. The tail cover 22 is an example of the "rear housing" of the present invention.

The power cord 2A extends rearward from a rear end portion of the tail cover 22. The power cord 2A is configured to be connected to an AC power supply (e.g., a commercial AC power supply Q illustrated in FIG. 14). A cylindrical part 222 is provided at a front portion of the power cord 2A. The cylindrical part 222 has a general cylindrical shape that is elongated in an up-down direction. A protrusion 222A is provided at the cylindrical part 222. The protrusion 222A protrudes inward from an inner surface of the cylindrical part 222 in a radial direction of the cylindrical part 222.

The base part 60 is provided to fix the circuit board part 6 inside the tail cover 22, and to fix the motor housing 21 and the tail cover 22 to each other. A front portion of the base part 60 has an upper portion formed with a through-hole 60*a* penetrating the front portion of the base part 60 in the front-rear direction, and has a lower portion formed with a through-hole 60*b* penetrating the front portion of the base part 60 in the front-rear direction. The through-holes 60*a* and 60*b* are arranged at the same positions in the up-down and left-right directions as the female threaded holes 211*a* and 211*b* formed in the bearing holding part 211 of the motor housing 21, respectively. In other words, the through-holes 60*a* and 60*b* are in communication with the female threaded holes 211*a* and 211*b* in the front-rear direction, respectively. A female threaded hole 60*c* extending in the front-rear direction is formed in an upper portion of a rear portion of the base part 60. The female threaded hole 60*c* is arranged at the same position as the through-hole 22*a* formed in the rear wall of the tail cover 22 in the up-down and left-right directions. In other words, the female threaded hole 60*c* is in communication with the through-hole 22*a* in the front-rear direction. The base part 60 also includes an extended part 60A. The extended part 60A forms a substantial columnar shape that is elongated in the up-down direction at a rear end portion of the base part 60. An outer circumferential surface of the extended part 60A has a shape identical to the inner surface of the cylindrical part 222. A female threaded hole 60*d* extending in the up-down direction is formed in the extended part 60A.

In the present embodiment, the motor housing 21 and the tail cover 22 are connected to each other through the base part 60. Specifically, the fixing screw 2B is screwed into the female threaded hole 211*a* formed in the bearing holding part 211 of the motor housing 21 through the through-hole 60*a* of the base part 60, and the fixing screw 2C is screwed into the female threaded hole 211*b* formed in the bearing holding part 211 through the through-hole 60*b* of the base part 60 in order to fix the base part 60 and the motor housing 21 to each other. In the meantime, the fixing screw 2D is screwed into the female threaded hole 60*c* of the base part 60 through the through-hole 22*a* formed in the rear wall of the tail cover 22 to fix the base part 60 and the tail cover 22 to each other. In the present embodiment, detachment of the power cord 2A from the housing 2 is restrained by fitting the extended part 60A of the base part 60 into the cylindrical part 222 of the power cord 2A and screwing the fixing screw 2E into the female threaded hole 60*d* through the protrusion 222A.

As illustrated in FIG. 1, a gripping part 20, which is a portion that an operator grips during operations, is provided to span across a rear portion of the motor housing 21 and a front portion of the tail cover 22. A configuration of the tail cover 22 will be described later in greater detail.

The gear housing 23 illustrated in FIGS. 1 and 2 is manufactured through the integral molding of aluminum or other metals, for example. The gear housing 23 accommodates the power transmission part 7 therein and rotatably supports the output part 8. Ball bearings 23A and 23B, and a needle bearing 23C are provided in the gear housing 23. A wheel guard 24 is also provided at a rear portion of a lower end portion of the gear housing 23. The wheel guard 24 is formed so as to cover a rear portion of the grinding wheel P attached to the output part 8. Further, as illustrated in FIG. 1, an exhaust port part 2*a* is provided at an upper portion of the gear housing 23. The exhaust port part 2*a* has exhaust ports formed in a front portion of the gear housing 23 that penetrate the front portion of the gear housing 23 in the front-rear direction. In the present embodiment, the gear housing 23 and the motor housing 21 are fixed to each other by screws or another prescribed configuration.

The motor 5 illustrated in FIG. 2 is an AC brushless motor, and includes a rotation shaft 51, a rotor 52, a stator 53, and three magnetic sensors 54 (see FIG. 14). The motor 5 is an example of the "motor" of the present invention.

The rotation shaft 51 extends in the front-rear direction. The rotation shaft 51 has a rear end portion supported by the ball bearing 23A and a front portion supported by the ball bearing 23A. With this configuration, the rotation shaft 51 is supported by the motor housing 21 and the gear housing 23 so as to be rotatable about an axis extending in the front-rear direction. A cooling fan 51A is provided on the front portion of the rotation shaft 51. The rotation shaft 51 is an example of the "rotation shaft" of the present invention.

The cooling fan 51A is provided on the rotation shaft 51 so as to be rotatable together with the rotation shaft 51. The cooling fan 51A is configured such that the cooling fan 51A can generate an airflow in the housing 2 between an intake port part 22A and the exhaust port part 2*a* for cooling the motor 5 by rotation upon receipt of a driving force of the motor 5.

The rotor 52 is a rotor having permanent magnets (see FIG. 14) and is fixed to the rotation shaft 51 so as to be rotatable coaxially and together with the rotation shaft 51. The stator 53 has a substantial hollow cylindrical shape elongated in the front-rear direction, and includes three star-connected stator coils U, V, and W (see FIG. 14). The three magnetic sensors 54 are Hall elements arranged on a circuit board (not illustrated), which is provided rearward of the stator 53. The three magnetic sensors 54 are provided on the circuit board at intervals of approximately 60° in a circumferential direction of the rotation shaft 51. Each of the magnetic sensors 54 is connected to the controller 10 via a signal line.

The power transmission part 7 illustrated in FIG. 2 is interposed between the motor 5 and the output part 8 inside the housing 2. The power transmission part 7 decelerates the rotation of the rotation shaft 51 of the motor 5 and transmits the decelerated rotation to the output part 8. The power transmission part 7 includes a pinion gear 71 and a bevel gear 72 those are meshingly engaged with each other.

The pinion gear 71 has a substantial hollow cylindrical shape elongated in the front-rear direction, and is fixed to a front end portion of the rotation shaft 51 so as to be rotatable coaxially and together with the rotation shaft 51. An outer shape of the pinion gear 71 is formed to taper toward the front. A plurality of gear teeth is provided on an outer circumferential surface of the pinion gear 71.

The bevel gear 72 has a general annular shape in a plan view and is configured to be rotatable about an axis extending in a direction orthogonal to the rotational axes of the rotation shaft 51 and the pinion gear 71 (i.e., in the up-down direction). A plurality of gear teeth those are meshingly engaged with the plurality of gear teeth on the pinion gear 71 is provided on the bevel gear 72.

The output part 8 illustrated in FIG. 2 includes an output shaft 81, and a washer 82 and a nut 83 that retain the grinding wheel P so as to be detachably attachable.

The output shaft 81 has a general columnar shape elongated in the up-down direction. The output shaft 81 is rotatably supported by the gear housing 23 via the needle bearing 23C and the ball bearing 23B. The output shaft 81 includes a male threaded part 81A. The male threaded part 81A constitutes a lower portion of the output shaft 81 and, has an outer circumferential surface into which threads are cut.

The washer 82 is provided at the lower portion of the output shaft 81. The washer 82 includes a cylindrical part 82A. The cylindrical part 82A has an inner diameter identical to an outer diameter of the male threaded part 81A, and the male threaded part 81A is inserted into the cylindrical part 82A.

The nut 83 is provided a lower end portion of the output shaft 81. The nut 83 is configured to be screwed onto the male threaded part 81A. The grinding wheel P is fixed to the output shaft 81 by inserting the cylindrical part 82A of the washer 82 into a through-hole formed in a center of the grinding wheel P in a plan view, and, while an upper surface of the grinding wheel P contacts a lower surface of the washer 82, screwing the nut 83 onto the male threaded part 81A. Similarly, the grinding wheel P is detached from the output shaft 81 by unscrewing the nut 83 from the male threaded part 81A.

For example, the grinding wheel P may be a resinoid flexible grinding wheel, a flexible grinding wheel, a resinoid grinding wheel, a sanding disc, or the like having a substantial circular shape in a plan view and a diameter of 100 mm. Depending on the types of material and abrasive grains selected for use, the grinding wheel P can perform flat and curved surface grinding of metal, synthetic resin, marble, concrete, and the like. While the grinding wheel P is fixed to the output shaft 81, the rear portion of the grinding wheel P is covered with the wheel guard 24 provided on the rear portion of the lower end portion of the gear housing 23. Note that, although the grinding wheel P is attached to the output part 8 in the present embodiment, other end bit tools, such as a bevel wire brush, a nonwoven brush, or a diamond wheel, are also attachable to the output shaft 81.

Figure 10:
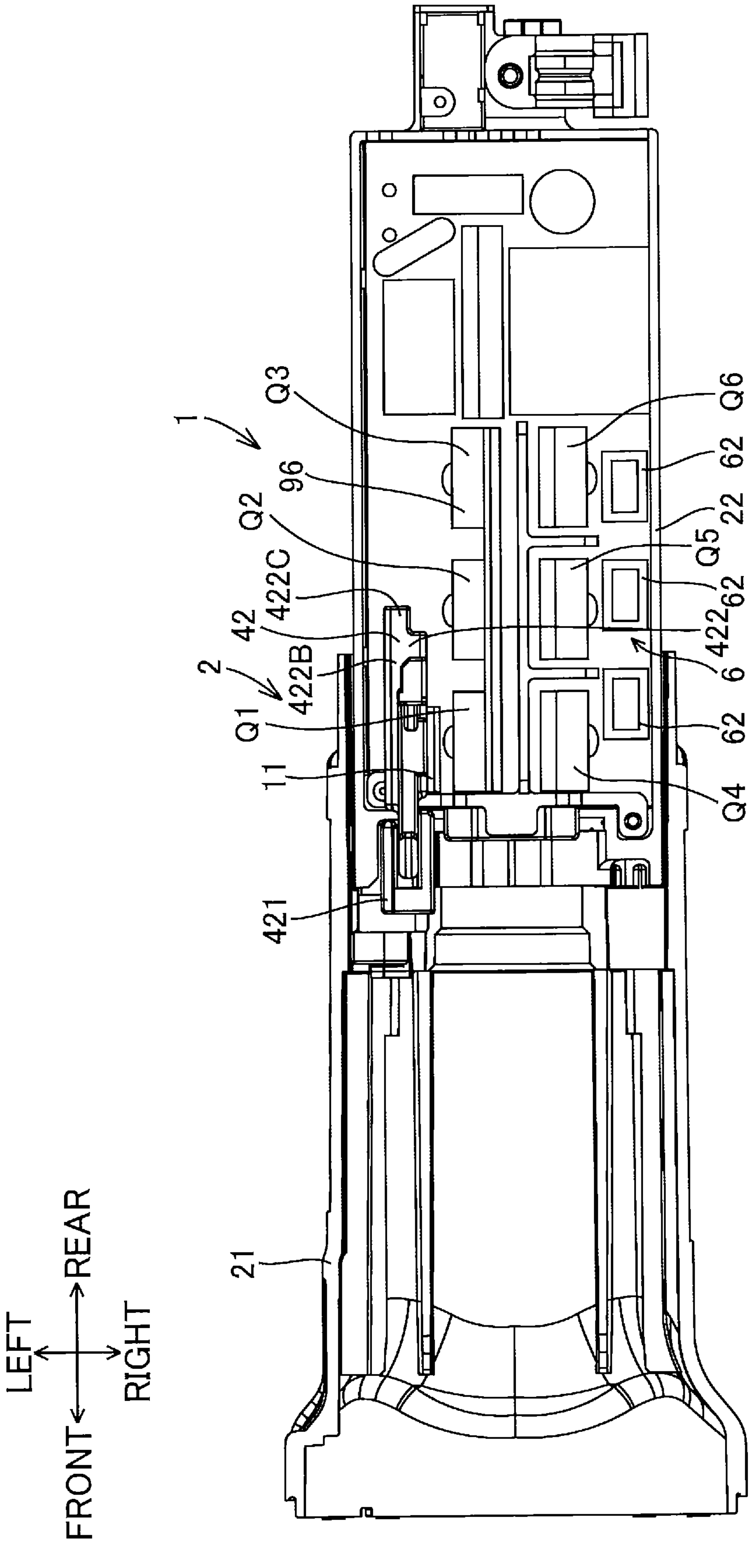
FIG. 10 is a cross-sectional view illustrating arrangement of the intervening part of the lever part in the disc grinder according to the first embodiment of the present invention.

As illustrated in FIG. 2, the circuit board part 6 is accommodated in the tail cover 22, and includes a circuit board 61, and connectors 62 (see FIG. 10). The circuit board 61 is fixed to the base part 60. Various circuit elements such as switching elements Q1-Q6 that configure an inverter circuit 96, the controller 10, and the like are mounted on the circuit board 61. The connectors 62 are provided for connecting various signal lines. The circuit board part 6 is an example of the "controller" of the present invention.

Next, an electrical configuration of the disc grinder 1 will be described with reference to FIG. 14. As illustrated in FIG. 14, the disc grinder 1 includes the power supply circuit 9 and the controller 10. The power supply circuit 9 and the controller 10 are mounted on the circuit board 61.

The power supply circuit 9 is configured such that the power supply circuit 9 can supply power from the commercial AC power supply Q to the motor 5. The power supply circuit 9 includes a noise filter circuit 91, a rectifier circuit 92, a positive line 93, a negative line 94, a smoothing circuit 95, the inverter circuit 96, and a constant voltage power supply circuit 97.

The noise filter circuit 91 is a circuit provided for noise reduction. As illustrated in FIG. 14, the noise filter circuit 91 includes a first terminal 91A, a second terminal 91B, a choke coil 91C, and a capacitor 91D. A voltage of the commercial AC power supply Q is applied across the first terminal 91A and the second terminal 91B while the power cord 2A is connected to the commercial AC power supply Q. The choke coil 91C and the capacitor 91D are filtering elements for reducing noise propagated from the commercial AC power supply Q to the power supply circuit 9. The choke coil 91C is connected in series between the rectifier circuit 92 and the commercial AC power supply Q. The capacitor 91D is connected in parallel with the commercial AC power supply Q.

As illustrated in FIG. 14, the rectifier circuit 92 is a diode bridge circuit having four diodes 92A (four rectifying elements). The rectifier circuit 92 rectifies an AC voltage outputted from the commercial AC power supply Q through the noise filter circuit 91 and outputs the rectified voltage to the smoothing circuit 95. In other words, the rectifier circuit 92 converts the AC voltage from the commercial AC power supply Q to a DC voltage and outputs this DC voltage to the smoothing circuit 95.

As illustrated in FIG. 14, the positive line 93 and the negative line 94 connect the rectifier circuit 92 and the inverter circuit 96 to each other. The negative line 94 is also connected to ground (GND; not illustrated).

The smoothing circuit 95 is connected between the rectifier circuit 92 and the inverter circuit 96. The smoothing circuit 95 smooths the DC voltage outputted from the rectifier circuit 92 and outputs the smoothed voltage to the inverter circuit 96. The smoothing circuit 95 includes a first capacitor 95A, a second capacitor 95B, and a resistor 95C.

The first capacitor 95A is a polarized electrolytic capacitor and is connected between the positive line 93 and the negative line 94. In the present embodiment, the first capacitor 95A has a capacitance of approximately 180 μF, but small capacitors with a capacitance between 40 and 200 μF may be employed, as well. The second capacitor 95B is a non-polarized film capacitor and is connected between the positive line 93 and the negative line 94. In the present embodiment, the second capacitor 95B has a capacitance of approximately 4.7 μF. The resistor 95C is a discharge resistor. The resistor 95C is connected between the positive line 93 and the negative line 94 in parallel with the second capacitor 95B.

The inverter circuit 96 has the six switching elements Q1-Q6 connected in a three-phase bridge formation. In the present embodiment, the switching elements Q1-Q6 are MOSFETs (Metal Oxide Semiconductor Field Effect Transistors), but may be other types of switching elements, such as IGBTs (Insulated Gate Bipolar Transistors).

Gates of the switching elements Q1-Q6 are connected to the controller 10 and perform switching operations based on control signals inputted from the controller 10. Further, drain or source of each of the switching elements Q1-Q6 is connected to one of the stator coils U, V, and W. As illustrated in FIG. 10, the switching elements Q1-Q6 are arranged in an approximate center in the left-right direction of the tail cover 22 so as to form two rows juxtaposed in the left-right direction of three switching elements aligned in the front-rear direction.

The constant voltage power supply circuit 97 illustrated in FIG. 14 is connected between the positive line 93 and the negative line 94. The constant voltage power supply circuit 97 includes a diode 97A, a capacitor 97B, an IPD circuit 97C, a capacitor 97D, and a regulator 97E. The constant voltage power supply circuit 97 converts the DC voltage outputted from the rectifier circuit 92 to generate a stabilized reference voltage and supplies this reference voltage to the controller 10 and the like.

The controller 10 has an arithmetic unit, a ROM, a RAM, and the like those are not illustrated in the drawings. The controller 10 is configured to control the inverter circuit 96 based on signals from the electronic switch 11 to drive the motor 5. The controller 10 detects a rotated position of the rotor 52 based on signals outputted from each of the three magnetic sensors 54 and forms control signals for switching the switching elements Q1-Q6 on and off based on the detection results. The controller 10 outputs these control signals to the switching elements Q1-Q6 for sequentially switching winding among the stator coils U, V, and W that conducts electricity in order to drive the rotor 52 to rotate in a prescribed rotating direction.

Next, configurations of the tail cover 22 and the filter part 3 will be described in detail with reference to FIGS. 3 and 4.

Figure 3:
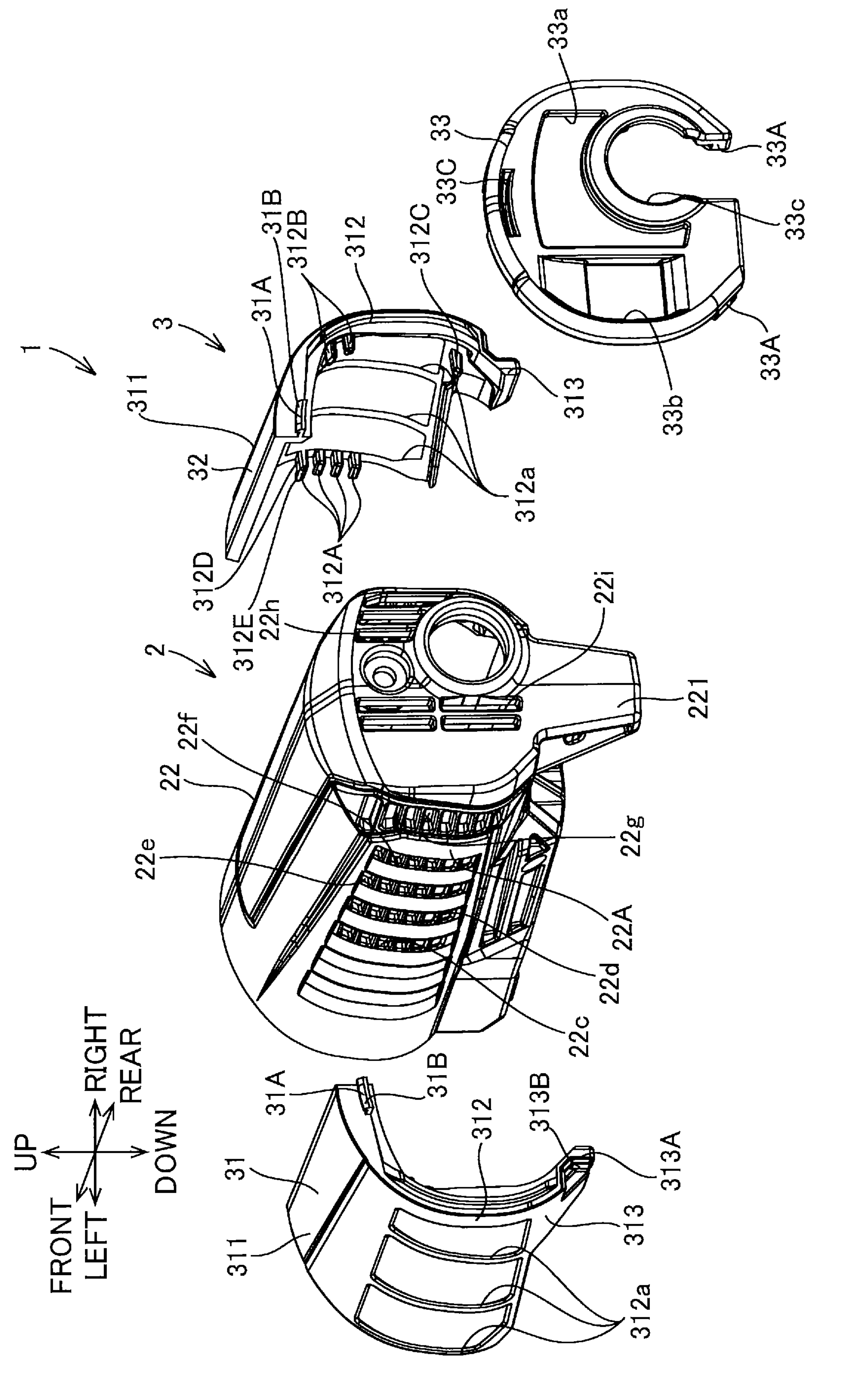
FIG. 3 is a perspective view illustrating a tail cover and a filter part of the disc grinder according to the first embodiment of the present invention as viewed from the approximate left and lower side thereof, and illustrating a state where the filter part is detached from the tail cover.

As illustrated in FIG. 3, the tail cover 22 includes the intake port part 22A that introduces cooling air for cooling the circuit elements, the controller 10, and the like mounted on the circuit board 61. The intake port part 22A has intake port groups 22*c*, 22*d*, 22*e*, 22*f*, 22*g*, 22*h*, and 22*i*, each of which is configured of a plurality of intake ports. The intake port groups 22*c*, 22*d*, 22*e*, 22*f*, and 22*g* are all formed symmetrically on the left and right walls of the tail cover 22 at the rear portion of the tail cover 22. In other words, the intake port part 22A has intake port groups formed in a left side surface of the tail cover 22, and intake port groups formed in a right side surface of the tail cover 22. Thus, when referencing the intake port groups 22*c*, 22*d*, 22*e*, 22*f*, and 22*g* in the following description, the references will be based on the intake port groups formed in the left side surface of the tail cover 22.

The intake port group 22*c* penetrates the left side wall of the tail cover 22 in the left-right direction at an approximate center in the front-rear direction of the tail cover 22. In the present embodiment, the intake port group 22*c* is formed of six intake ports arranged successively in the up-down direction.

The intake port groups 22*d*, 22*e*, and 22*f* are formed at positions rearward of the intake port group 22*c* in the order of the intake port groups 22*d*, 22*e*, and 22*f*. The intake port groups 22*d*, 22*e*, and 22*f* penetrate the left side wall of the tail cover 22 in the left-right direction. In the present embodiment, each of the intake port groups 22*d*, 22*e*, and 22*f* is formed of six intake ports arranged successively in the up-down direction.

The intake port group 22*g* is positioned rearward of the intake port group 22*f* and penetrates the left side wall of the tail cover 22 in the left-right direction. In the present embodiment, the intake port group 22*g* has seven intake ports arranged successively in the up-down direction. The seven intake ports forming the intake port group 22*g* are elongated in the front-rear direction.

The intake port groups 22*h* and 22*i* are provided at the rear end portion in the front-rear direction of the tail cover 22 and penetrate the rear wall of the tail cover 22 in the front-rear direction. The intake port group 22*h* is formed at a right portion of the rear wall constituting the tail cover 22, and has three intake ports elongated in the up-down direction and arranged in the left-right direction. The intake port group 22*i* is formed at an approximate center portion of the rear wall of the tail cover 22 and has four intake ports elongated in the up-down direction. The four intake ports are arranged in two rows juxtaposed in the up-down direction.

Figure 4:
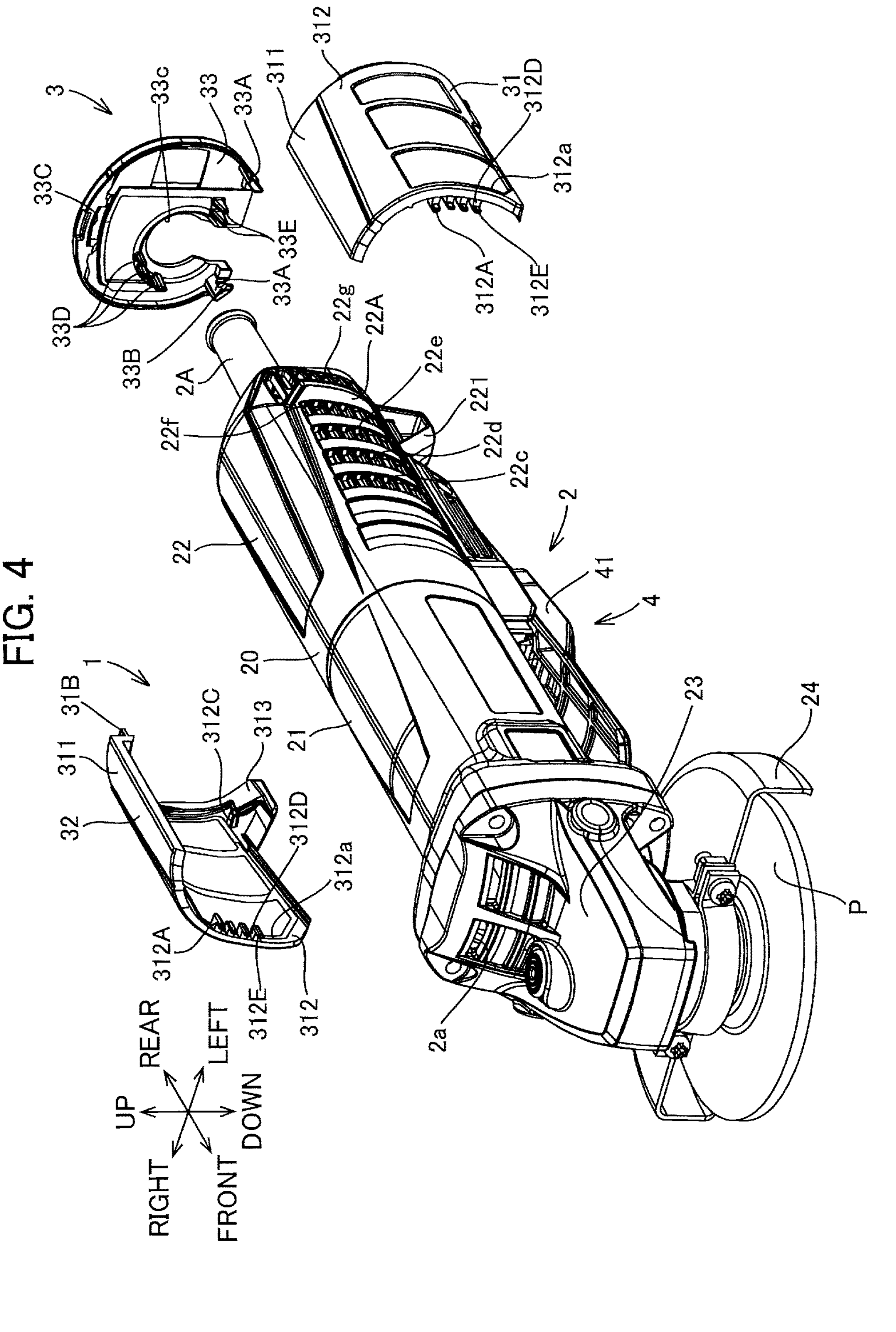
FIG. 4 is an explanatory view illustrating an attachment operation of the filter part to the tail cover in the disc grinder according to the first embodiment of the present invention, and illustrating a state where the filter part is detached from the tail cover.

The filter part 3 illustrated in FIGS. 3 and 4 is configured to be detachably attached to a rear half portion of the tail cover 22 so as to cover the intake port part 22A of the tail cover 22 in order to restrain dust from entering the tail cover 22 through the intake port part 22A during operations. Although the filter part 3 is configured to cover substantially the entire intake port part 22A in the present embodiment, the filter part 3 may be configured to cover only a portion of the intake port part 22A. The filter part 3 includes a left filter 31, a right filter 32, and a rear filter 33. In other words, the filter part 3 can be divided into the left filter 31, the right filter 32, and the rear filter 33. The left filter 31, the right filter 32, and the rear filter 33 are made of resin. The left filter 31 is configured to cover the intake port groups in the intake port part 22A formed in the left side surface of the tail cover 22. On the other hand, the right filter 32 is configured to cover the intake port groups in the intake port part 22A formed in the right side surface of the tail cover 22. The left filter 31 and the right filter 32 are configured with left-right symmetry. Accordingly, corresponding components in the left filter 31 and the right filter 32 are designated with the same reference numerals in the drawings. Further, the components of the left filter 31 and the right filter 32 will be described based on the components in one of the left filter 31 and the right filter 32, while descriptions of components in the other are omitted as appropriate.

As illustrated in FIG. 3, each of the left filter 31 and the right filter 32 includes an upper wall part 311, a side wall part 312, and a lower wall part 313. The upper wall part 311, the side wall part 312, and the lower wall part 313 are formed single piece structure. The upper wall part 311 extends in the front-rear direction and is formed so as to cover an upper surface on the left side of the tail cover 22 when the left filter 31 is attached to the tail cover 22. An upper engaging part 31A is provided at the upper wall part 311.

The upper engaging part 31A has a substantial plate shape that protrudes rearward from a right end portion of the upper wall part 311. The upper engaging part 31A is elastically deformable relative to the upper wall part 311. The upper engaging part 31A includes a hooking part 31B. The hooking part 31B is positioned at a rear end portion of the upper engaging part 31A and protrudes upward like a pawl in order that the upper engaging part 31A can be engaged with the rear filter 33 through elastic deformation.

The side wall part 312 of the right filter 32 is shaped so as to extend downward from a right end of the upper wall part 311. The side wall part 312 is formed to cover the side surface of the tail cover 22 when the right filter 32 is attached to the tail cover 22. Three openings 312*a* are formed in the side wall part 312 to be arranged in the front-rear direction. Although not illustrated in the drawings, a fine metal mesh is provided in each of the openings 312*a*. Pawls 312A, protrusions 312B, and a protrusion 312C are provided on the side wall part 312. Note that the side wall part 312 of the left filter 31 has an identical configuration to that described above.

The pawls 312A form general L-shapes that protrude from an inner surface of the side wall part 312. In the present embodiment, four pawls 312A are provided to be arranged in the up-down direction. The four pawls 312A are positioned to correspond to four intake ports of the intake port group 22*c* provided in the intake port part 22A of the tail cover 22. The four pawls 312A are configured to be engaged with walls forming the corresponding intake ports of the intake port group 22*c*. Each of the four pawls 312A includes a first part 312D, and a second part 312E.

The first part 312D extends inward from the inner surface of the side wall part 312 in a radial direction of the filter part 3. The second part 312E extends frontward from a distal end of the first part 312D.

The protrusions 312B protrude inward from the inner surface of the side wall part 312 in the radial direction of the filter part 3. In the present embodiment, two protrusions 312B are provided on an upper portion of the side wall part 312. The two protrusions 312B are arranged to correspond to the upper two intake ports within the intake port group 22*f* provided in the intake port part 22A of the tail cover 22. In a side view, each of the two protrusions 312B has a smaller area than an area of the corresponding intake port. Each of the two protrusions 312B is configured to enter the corresponding intake port when the filter part 3 is attached to the tail cover 22.

The protrusion 312C protrudes inward from the inner surface of the side wall part 312 in the radial direction of the filter part 3. In the present embodiment, one protrusion 312C is provided on a lower portion of the side wall part 312. The protrusion 312C is configured to correspond to one lower intake port in the intake port group 22*f* of the intake port part 22A. In a side view, the protrusion 312C has a smaller area than an area of the corresponding intake port. The protrusion 312C is configured to enter the corresponding intake port when the filter part 3 is attached to the tail cover 22.

The lower wall part 313 is shaped to extend downward from a lower end of a rear end portion of the side wall part 312. A lower engagement part 313A is provided at the lower wall part 313. The lower engagement part 313A is formed to be recessed inward from an outer surface of the lower wall part 313 in the radial direction of the filter part 3. The lower engagement part 313A includes an engagement protrusion 313B. The engagement protrusion 313B protrudes outward within an interior space of the lower engagement part 313A in the radial direction of the filter part 3.

The rear filter 33 is configured such that the rear filter 33 is attachable to the housing 2 and engageable with the left filter 31 and the right filter 32. The rear filter 33 has a substantial disc shape in a rear side view. The rear filter 33 includes a pair of lower engaging parts 33A, an upper engagement part 33C, protrusions 33D, and protrusions 33E. Note that, although the rear filter 33 is configured to function as a filter in the present embodiment, the rear filter 33 may instead be provided simply to connect the left filter 31 and the right filter 32 together in the left-right direction.

The lower engaging parts 33A are provided on a lower portion of the rear filter 33 and configured with left-right symmetry. Each of the two lower engaging parts 33A are configured to be engaged with the corresponding lower engagement parts 313A of the left filter 31 and the right filter 32. Each of the two lower engaging parts 33A is formed in a substantial plate shape that protrudes frontward from a front surface of the rear filter 33. The lower engaging parts 33A are elastically deformable relative to a body part of the rear filter 33. Each of the lower engaging parts 33A includes a hooking part 33B. The hooking part 33B is positioned at a front end portion of the lower engaging part 33A. The hooking parts 33B protrude like pawls inward in the radial direction of the filter part 3 and substantially downward in order that the lower engaging parts 33A can be engaged with the corresponding lower engagement parts 313A of the left filter 31 and the right filter 32 through elastic deformation.

The upper engagement part 33C is provided at an upper portion of the rear filter 33. The upper engagement part 33C is configured to be engaged with the upper engaging parts 31A of the left filter 31 and the right filter 32. Although not illustrated in the drawings, a recess recessed upward is provided at the upper engagement part 33C in order to receive the hooking parts 31B of the upper engaging parts 31A.

The protrusions 33D protrude frontward from the front surface of the rear filter 33. In the present embodiment, three protrusions 33D are provided on a right portion of the rear filter 33. The three protrusions 33D are arranged to correspond to the three intake ports of the intake port group 22*h* provided in the intake port part 22A of the tail cover 22. In a front side view, each of the protrusions 33D has a smaller area than an area of the corresponding intake port. Each of the three protrusions 33D is configured to enter the corresponding intake port when the filter part 3 is attached to the tail cover 22.

The protrusions 33E protrude frontward from the front surface of the rear filter 33. In the present embodiment, two protrusions 33E are provided on the lower portion of the rear filter 33. Each of the two protrusions 33E is configured to correspond to one of two intake ports in the intake port group 22*i* of the intake port part 22A. In a front side view, each of the two protrusions 33E has an area smaller than an area of the corresponding intake port. Each of the two protrusions 33E is configured to enter the corresponding intake port when the filter part 3 is attached to the tail cover 22.

An opening 33*a*, an opening 33*b*, and a notch 33*c* are also formed in the rear filter 33. The opening 33*a* extends from the right portion to a center portion of the rear filter 33 and penetrates the rear filter 33 in the front-rear direction. Although not illustrated in the drawings, a fine metal mesh is provided in the opening 33*a*. The opening 33*b* is formed in a left portion of the rear filter 33. The opening 33*b* has a rectangular shape and penetrates the rear filter 33 in the front-rear direction. In the present embodiment, the disc grinder 1 is not provided with a dial for adjusting a rotational speed of the motor 5. However, if such a dial for adjusting the rotational speed of the motor is provided on a rear portion of a tail cover configuring an electric work tool, the adjustment dial can be exposed to an outside through the opening 33*b*. The notch 33*c* is formed at the lower portion of the rear filter 33. The notch 33*c* is cut out upwardly to form a circular shape. The power cord 2A can be exposed to an outside through the notch 33*c* when the rear filter 33 is attached to the tail cover 22.

Next, operations for attaching the filter part 3 to and detaching the filter part 3 from the tail cover 22 will be described with reference to FIGS. 4 through 7.

Figure 5:
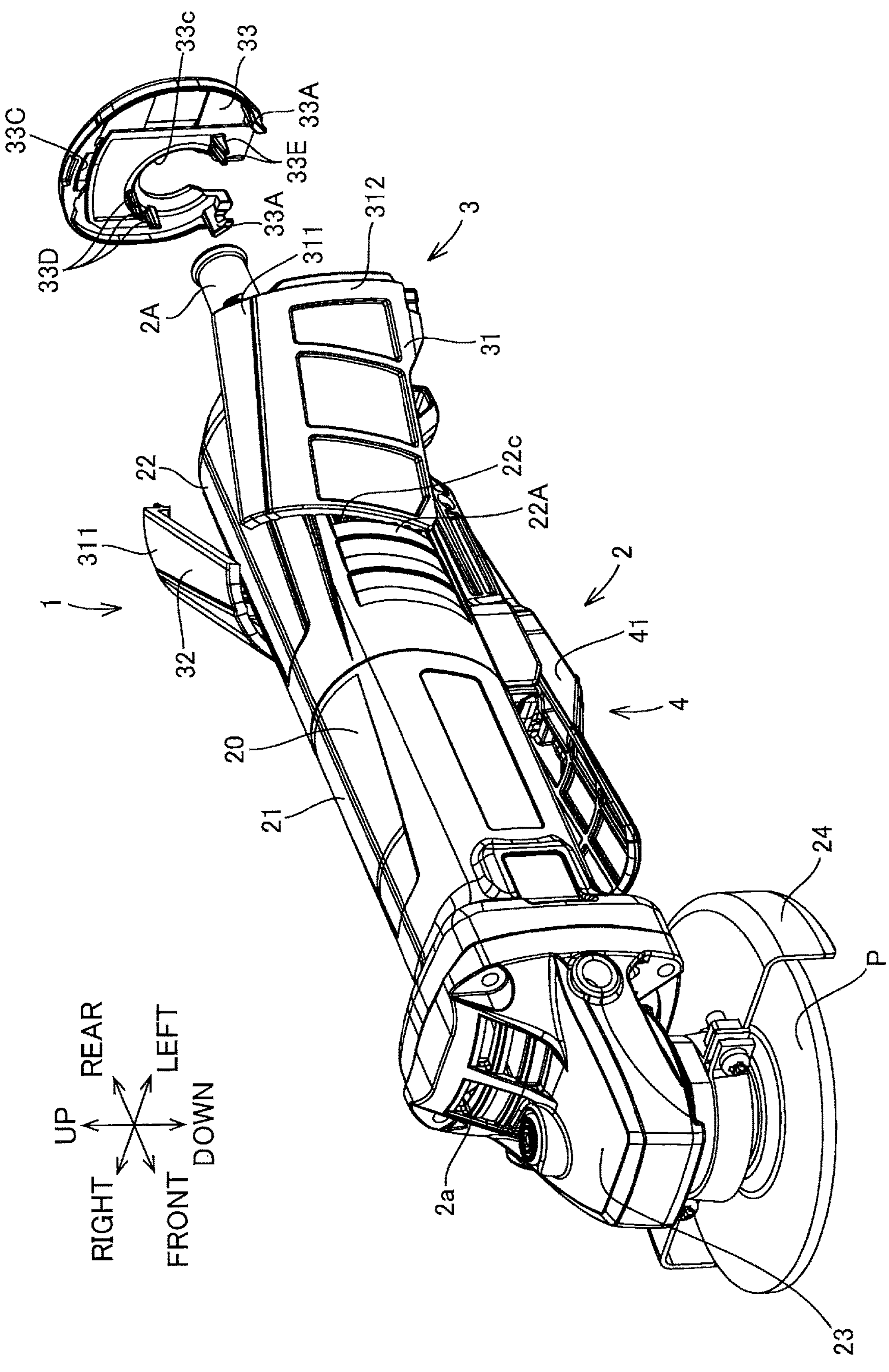
FIG. 5 is an explanatory view illustrating the attachment operation of the filter part to the tail cover in the disc grinder according to the first embodiment of the present invention, and illustrating a state where pawls of a left filler and a right filter is engaged with an intake port part formed in the tail cover.
Figure 6:
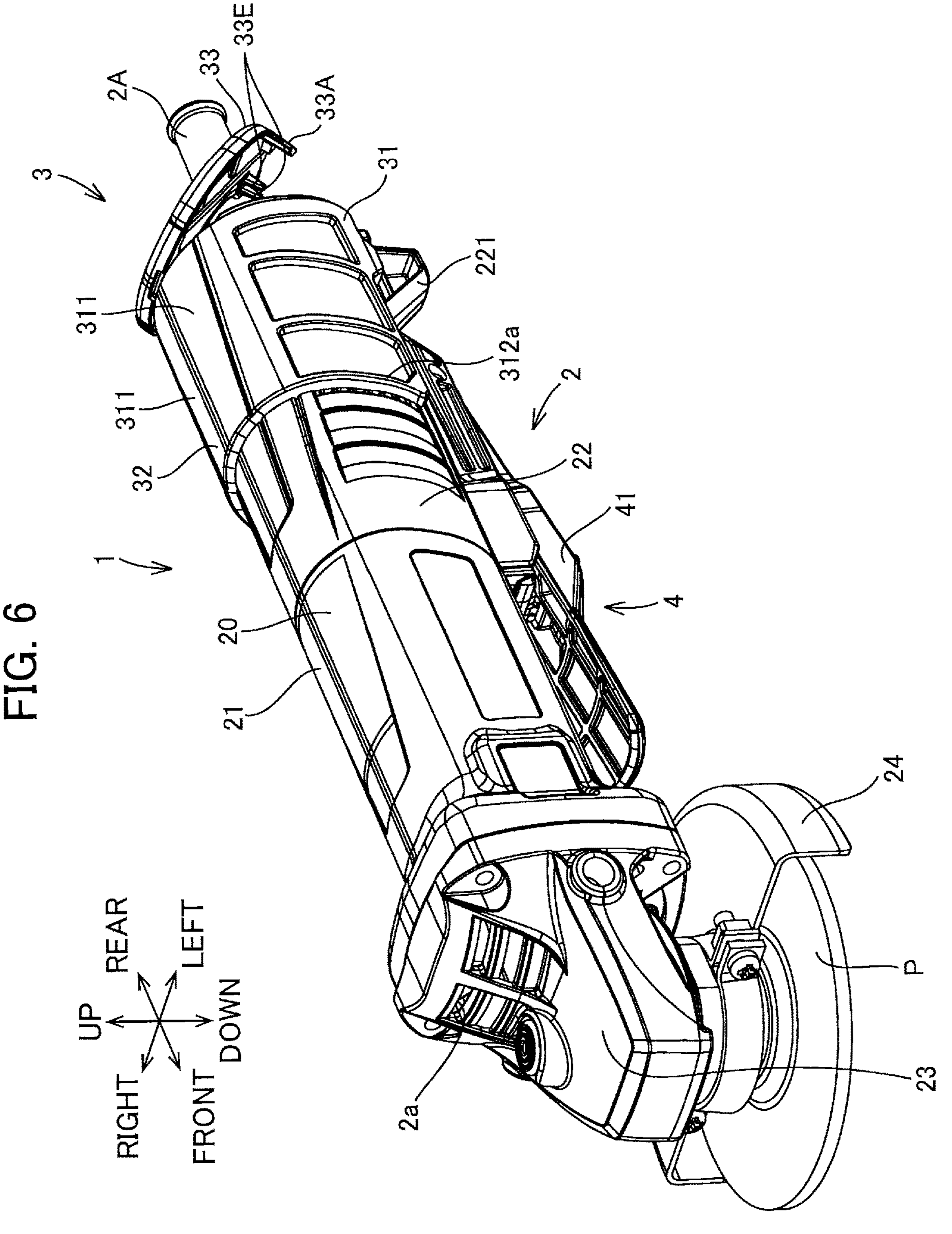
FIG. 6 is an explanatory view illustrating the attachment operation of the filter part to the tail cover in the disc grinder according to the first embodiment of the present invention, and illustrating a state where engaging parts of the left filter and the right filter and engagement parts of a rear filter are engaged with each other.

As illustrated in FIGS. 4 and 5, the operator first engages the pawls 312A on the left filter 31 and the right filter 32 with the intake port part 22A of the tail cover 22. Specifically, the operator causes the second parts 312E of the pawls 312A on each of the left filter 31 and the right filter 32 to enter the tail cover 22 through the corresponding intake port groups 22*c*. Next, the left filter 31 and the right filter 32 are attached to the tail cover 22 by pivotally moving the left filter 31 and the right filter 32 relative to the tail cover 22 about the pawls 312A so that rear portions of the left filter 31 and the right filter 32 approach the tail cover 22, as illustrated in FIG. 6. In this state, side surfaces of the second parts 312E inserted into the housing 2 opposes an inner surface of the housing 2. In addition, movement in the front-rear direction of the left filter 31 and the right filter 32 relative to the housing 2 is restricted by front surfaces of the first parts 312D constituting the pawls 312A opposing front walls forming the intake port groups 22*c* and rear surfaces of the first parts 312D opposing rear walls forming the intake port groups 22*c*. In other words, by pivotally moving the left filter 31 and the right filter 32 about the pawls 312A to a position illustrated in FIG. 6, the operator can retain the pawls 312A relative to the tail cover 22 such that the pawls 312A cannot separate away from the tail cover 22. Hereinafter, the position illustrated in FIG. 6 will be referred to as a fixed position.

At the same time, the protrusions 312B and 312C provided on the side wall part 312 of each of the left filter 31 and the right filter 32 enter the corresponding intake port groups 22*g* of the intake port part 22A. In this state, the left filter 31 and the right filter 32 are restricted from moving in the front-rear direction relative to the housing 2 by front surfaces of the protrusions 312B and 312C opposing front walls forming the intake port groups 22*g* and rear surfaces of the protrusions 312B and 312C opposing rear walls forming the intake port groups 22*g*. In other words, the left filter 31 and the right filter 32 can be engaged with the tail cover 22 without any elastic deformation (non-active engagement). In this specification, engagement between members that requires elastic deformation of at least one of the members when moving into or out of the engaged state is referred to as active engagement, while conversely engagement that does not require such elastic deformation of members is referred to as non-active engagement.

In this state, the intake port groups 22*c*, 22*d*, 22*e*, 22*f*, and 22*g* of the intake port part 22A that are formed in the side surfaces of the tail cover 22 are covered from the sides by the metal mesh provided in the openings 312*a* formed in the left filter 31 and the right filter 32. This metal mesh prevents dust from entering the housing 2 through the intake port groups 22*c*, 22*d*, 22*e*, 22*f*, and 22*g* during operations.

Next, as illustrated in FIGS. 5 and 6, the operator moves the rear filter 33 frontward relative to the left filter 31 and the right filter 32 so as to engage the upper engaging parts 31A on the left filter 31 and the right filter 32 with the upper engagement part 33C of the rear filter 33. In other words, the operator moves the rear filter 33 in a direction crossing the left-right direction relative to the left filter 31 and the right filter 32. As the hooking parts 31B on the upper engaging parts 31A contact and are pressed against the upper engagement part 33C, the upper engaging parts 31A are elastically deformed downward relative to the left filter 31 and the right filter 32. Subsequently, the hooking parts 31B enter the upwardly recessed area formed in the upper engagement part 33C, pressure applied to the upper engaging parts 31A is released and the upper engaging parts 31A is elastically deformed upward to return to their state prior to being pressed by the upper engagement part 33C.

Figure 7:
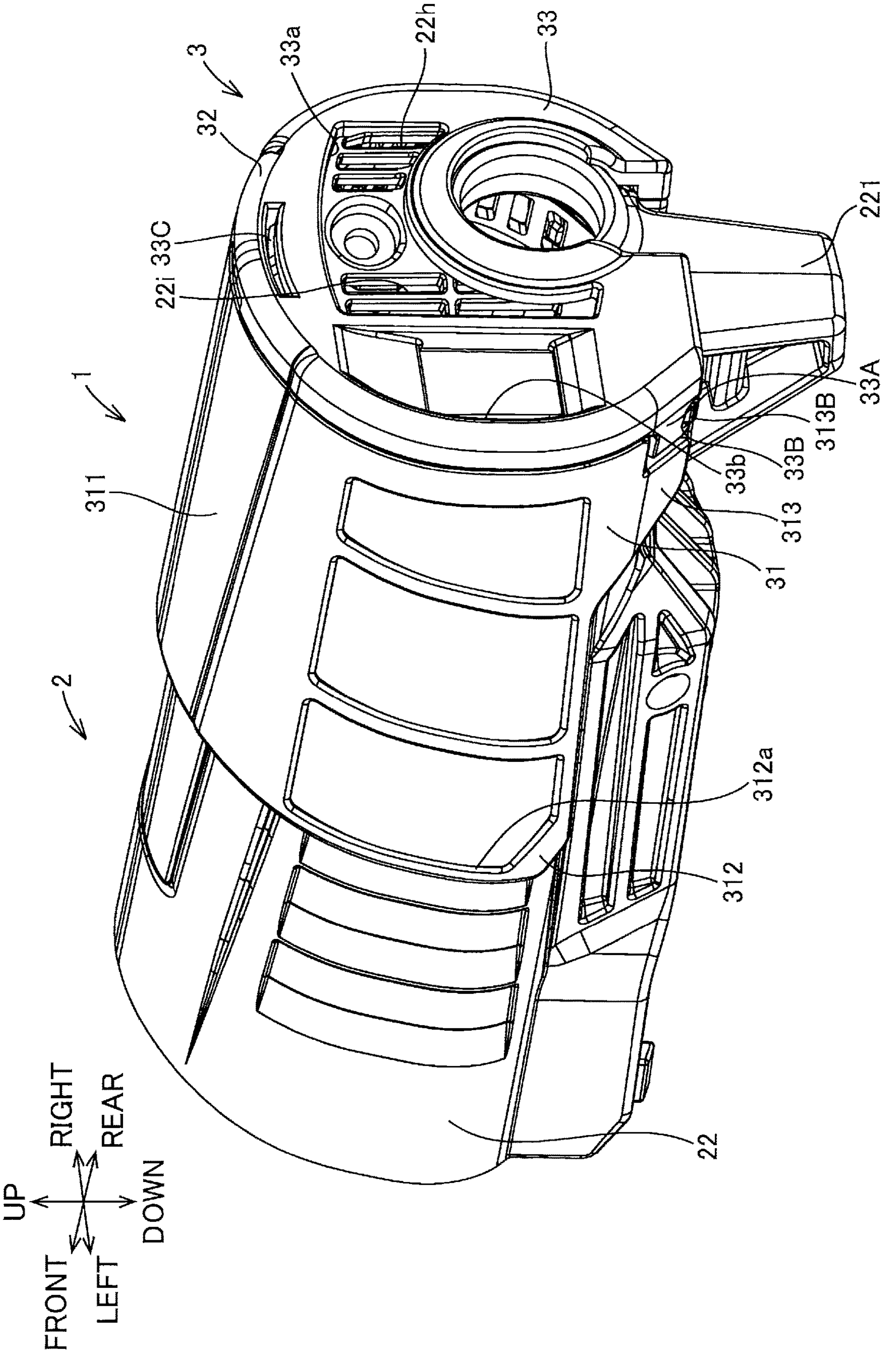
FIG. 7 is a perspective view illustrating the tail cover and the filter part of the disc grinder according to the first embodiment of the present invention as viewed from the approximate left and lower side thereof, and illustrating a state where the filter part is attached to the tail cover.

As illustrated in FIGS. 6 and 7, the operator then pivotally moves the rear filter 33 in a clockwise direction in the drawings relative to the left filter 31 and the right filter 32 in order to engage the lower engagement parts 313A on the left filter 31 and the right filter 32 with the lower engaging parts 33A on the rear filter 33. In other words, the operator pivotally moves the rear filter 33 in a direction crossing the left-right direction relative to the left filter 31 and the right filter 32. As the hooking parts 33B of the lower engaging parts 33A contact the engagement protrusions 313B provided on the lower engagement parts 313A and are pressed outward in the radial direction of the filter part 3, the lower engaging parts 33A are elastically deformed radially outward relative to the left filter 31 and the right filter 32. When the hooking parts 33B subsequently become engaged with the engagement protrusions 313B, as illustrated in FIG. 7, pressure on the lower engaging parts 33A is released and the lower engaging parts 33A are elastically deformed radially inward and return to their state prior to being pressed by the engagement protrusions 313B. That is, through the engagement between the upper engaging parts 31A and the upper engagement part 33C and the engagement between the lower engaging parts 33A and the lower engagement parts 313A, the left filter 31 and the right filter 32 can be engaged with the rear filter 33 through elastic deformation (active engagement). Since the engagement between the upper engaging parts 31A and the upper engagement part 33C and the engagement between the lower engaging parts 33A and the lower engagement parts 313A require elastic deformation to be disengaged, a force of engagement is suitably strong enough to restrain detachment of the rear filter 33 from the left filter 31 and the right filter 32.

In this state, the intake port groups 22*h* and 22*i* of the intake port part 22A formed in the rear surface of the tail cover 22 are covered from the rear side by the metal mesh provided in the opening 33*a*. This metal mesh restrains dust from entering the housing 2 through the intake port groups 22*h* and 22*i* during operations.

Note that, in the above description, the lower engaging parts 33A are engaged with the lower engagement parts 313A after the engagement of the upper engaging parts 31A with the upper engagement part 33C, but the order of engagement is not limited to this order. Specifically, the lower engaging parts 33A may be engaged with the lower engagement parts 313A prior to engagement of the upper engaging parts 31A with the upper engagement part 33C, or both engagements may be performed simultaneously.

At this time, movement of the rear filter 33 in the front-rear direction relative to the left filter 31 is restricted by the engagement between the upper engaging part 31A of the left filter 31 and the upper engagement part 33C and the engagement of the lower engaging part 33A and the lower engagement part 313A of the left filter 31, and movement of the right filter 32 in the front-rear direction relative to the rear filter 33 is restricted by the engagement between the upper engaging part 31A of the right filter 32 and the upper engagement part 33C and the engagement between the lower engaging part 33A and the lower engagement part 313A of the right filter 32. Hence, relative positions of the rear filter 33, the left filter 31, and the right filter 32 can be suitably set.

Further, since the hooking parts 31B of the upper engaging parts 31A protrude upward and the hooking parts 33B of the lower engaging parts 33A protrude substantially inward of the filter part 3, movement of the rear filter 33 in the front-rear direction relative to the left filter 31 and the right filter 32 can be suitably restricted.

Additionally, the protrusions 33D provided on the front surface of the rear filter 33 enter the intake port group 22*h* of the intake port part 22A and the protrusions 33E enter the intake port group 22*i*. Thus, the rear filter 33 becomes engaged with the tail cover 22 without elastic deformation (non-active engagement). In this state, right surfaces of the protrusions 33D oppose right walls forming the intake ports in the intake port group 22*h*, and left surfaces of the protrusions 33D oppose left walls forming the intake ports in the intake port group 22*h*. Similarly, right surfaces of the protrusions 33E oppose right walls forming the intake ports in the intake port group 22*i*, and left surfaces of the protrusions 33E oppose left walls forming the intake ports in the intake port group 22*i*. This configuration restricts the rear filter 33 from moving in the left-right direction relative to the tail cover 22.

As described above, the pawls 312A of the left filter 31 and the right filter 32 can be non-actively engaged with the tail cover 22, i.e., without elastic deformation, while the upper engaging parts 31A of the left filter 31 and the right filter 32 can be actively engaged with the rear filter 33, i.e., with elastic deformation. In other words, since it is not necessary to fix the left filter 31 and the right filter 32 to the housing 2 by elastically deforming parts of the housing 2, deterioration of the housing 2 can be suppressed. Further, by using simple holes in the housing 2 as engaging parts, such as intake ports described in the present embodiment, the filter part 3 can be attached to the housing 2 without requiring a special configuration on the housing 2 for active engagement. Hence, the filter of the present invention can be attached to or detached from a conventional work tool that only has intake ports or a work tool having a simple construction for suppressing manufacturing costs. Further, since the filter part 3 is ultimately fixed to the housing 2 through active engagement, a suitable fixing force for the filter part 3 can be secured.

Further, since engagement between the rear filter 33 and the housing 2 without elastic deformation restricts movement of the rear filter 33 in the left-right direction relative to the housing 2, engagement of the left filter 31 and the right filter 32 with the rear filter 33 (active engagement) can suitably fix the left filter 31 and the right filter 32 to the housing 2. Further, since the rear filter 33 and the housing 2 are engaged with each other without elastic deformation, this configuration can suppress deterioration of the housing 2.

In order to detach the filter part 3 from the tail cover 22, first the operator disengages the rear filter 33 from the left filter 31 and the right filter 32. Specifically, as illustrated in FIGS. 6 and 7, the operator pivotally moves the rear filter 33 in a counterclockwise direction in the drawings relative to the left filter 31 and the right filter 32 so as to disengage the lower engagement parts 313A of the left filter 31 and the right filter 32 from the lower engaging parts 33A of the rear filter 33. In other words, the operator moves the rear filter 33 in a direction crossing the left-right direction relative to the left filter 31 and the right filter 32. At this time, the hooking parts 33B of the lower engaging parts 33A contact to be pressed by the engagement protrusions 313B provided on the lower engagement parts 313A, thereby causing the lower engaging parts 33A to be elastically deformed radially outward relative to the filter part 3. When the lower engaging parts 33A subsequently separate from the lower engagement parts 313A, as illustrated in FIG. 6, the lower engaging parts 33A are elastically deformed to return to their state before the lower engaging parts 33A are pressed by the engagement protrusions 313B.

Next, as illustrated in FIGS. 5 and 6, the operator moves the rear filter 33 rearward relative to the left filter 31 and the right filter 32 so that the upper engaging parts 31A on the left filter 31 and the right filter 32 are disengaged from the upper engagement part 33C of the rear filter 33. In other words, the operator moves the rear filter 33 in a direction crossing the left-right direction relative to the left filter 31 and the right filter 32. At this time, the hooking parts 31B of the upper engaging parts 31A contact and are pressed by the upper engagement part 33C to cause the upper engaging parts 31A to be elastically deformed downward relative to the left filter 31 and the right filter 32. When the upper engaging parts 31A subsequently separate from the upper engagement part 33C, as illustrated in FIG. 5, the upper engaging parts 31A are elastically deformed to return to their state prior to being pressed by the upper engagement part 33C.

Then, the operator pivotally moves the left filter 31 and the right filter 32 relative to the tail cover 22 about their respective pawls 312A so that the rear portions of the left filter 31 and the right filter 32 separate from the tail cover 22, and subsequently detaches the left filter 31 and the right filter 32 from the tail cover 22. That is, by pivotally moving the left filter 31 and the right filter 32 about the pawls 312A to a position illustrated in FIG. 5, the operator can separate the pawls 312A from the tail cover 22. Hereinafter, the position illustrated in FIG. 5 will be referred to as an attachment-detachment position.

Thus, the disc grinder 1 according to the present embodiment is configured so that the left filter 31 and the right filter 32 can be easily detached from the tail cover 22 simply by moving the rear filter 33 in a direction crossing the left-right direction, thereby improving usability.

Further, the rear filter 33 can be engaged with the left filter 31 and the right filter 32 and the tail cover 22 when the left filter 31 and the right filter 32 are at the fixed position, and restricts the left filter 31 and the right filter 32 from moving from the fixed position to the attachment-detachment position while the rear filter 33 is engaged with the left filter 31 and the right filter 32 and the tail cover 22. Therefore, there is no need to provide the housing 2 with a new configuration for engaging the left filter 31 and the right filter 32 with the tail cover 22.

Further, the left filter 31 and the right filter 32 cannot be detached from the tail cover 22, even when the rear filter 33 is detached from the tail cover 22, unless the left filter 31 and the right filter 32 are moved from the fixed position to the attachment-detachment position. Accordingly, this configuration can suppress inadvertent detachment of the left filter 31 and the right filter 32 from the tail cover 22.

Further, the left filter 31 and the right filter 32 are moved between the attachment-detachment position and the fixed position in accordance with pivotal movement of the left filter 31 and the right filter 32 relative to the tail cover 22 about points of engagement between the pawls 312A and the intake port part 22A. Accordingly, the left filter 31 and the right filter 32 is movable between the attachment-detachment position and the fixed position through a simple configuration.

Since the pawls 312A are engaged with the intake port part 22A without elastic deformation when the left filter 31 and the right filter 32 are moved from the attachment-detachment position to the fixed position, deterioration of the housing 2 can be restrained.

While the left filter 31 and the right filter 32 are configured as two filter halves having left-right symmetry, movement of the left filter 31 and the right filter 32 toward the attachment-detachment position can be suitably restricted by engaging both filter halves, i.e., the left filter 31 and the right filter 32, with the rear filter 33.

Next, detailed configurations of the motor housing 21, the lever part 4, and the electronic switch 11, and arrangement of the lever part 4 in the housing 2 will be described with reference to FIGS. 1, 2, and 8 through 12.

Figure 8:
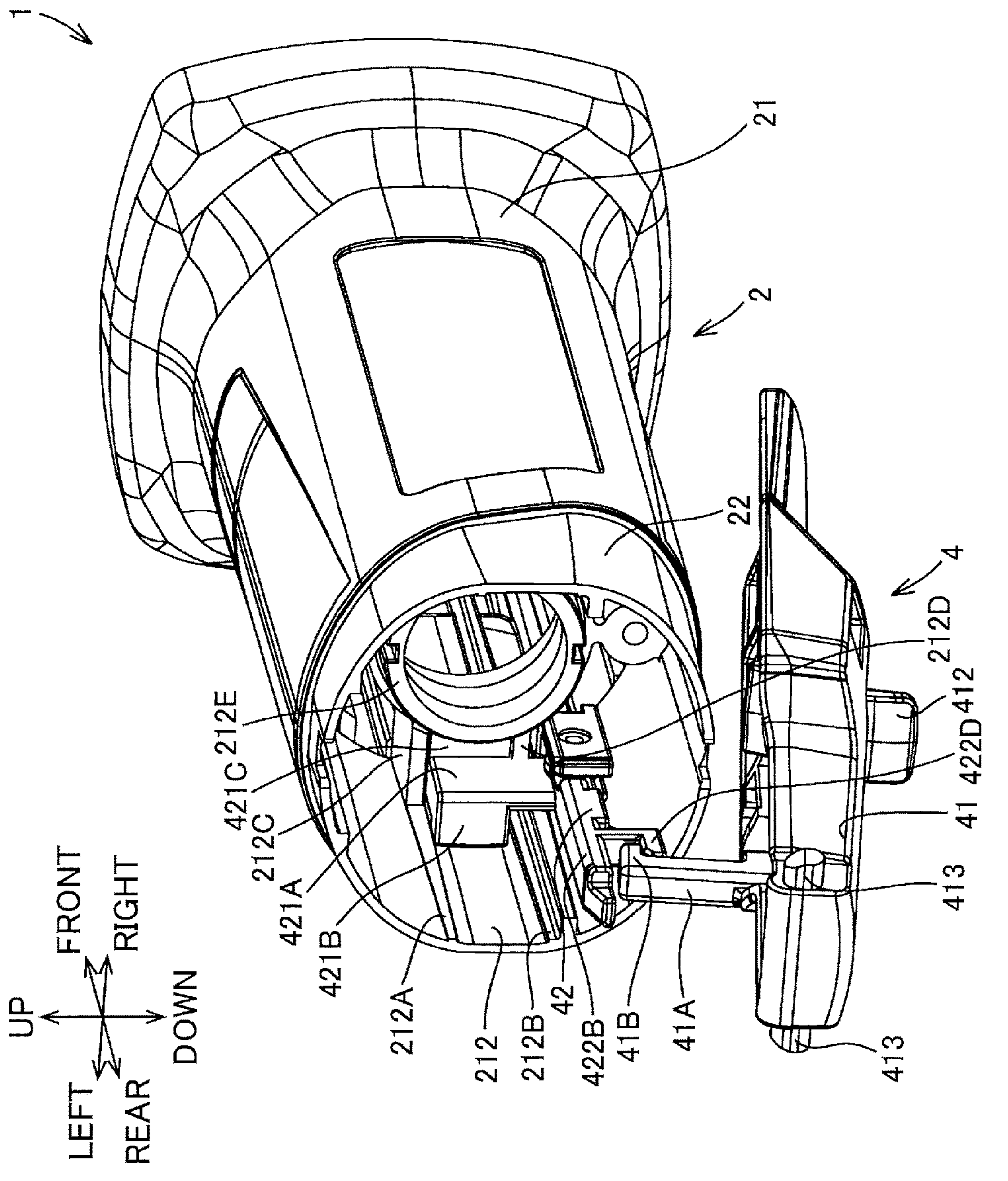
FIG. 8 is a perspective view illustrating arrangement of an intervening part of a lever part inside a housing in the disc grinder according to the first embodiment of the present invention.

As illustrated in FIGS. 1, 2, and 8, the lever part 4 is provided downward of the tail cover 22, and includes a paddle lever 41, and an intervening part 42. The paddle lever 41 is arranged on the gripping part 20 that spans over the motor housing 21 and the tail cover 22, and extends in the front-rear direction. A pressing part 41A, a spring 411, an off-lock mechanism 412, and a pivot shaft 413 are provided at the paddle lever 41. The paddle lever 41 is an example of the "operating part" of the present invention.

As illustrated in FIG. 8, the pressing part 41A has a substantial columnar shape protruding into the housing 2 from a rear portion of the paddle lever 41. The pressing part 41A includes a lever engaging part 41B. The lever engaging part 41B protrudes from a distal end of the pressing part 41A in a direction orthogonal to a direction in which the pressing part 41A extends.

As illustrated in FIG. 1, the pivot shaft 413 is provided at the rear portion of the paddle lever 41, and has a substantial columnar shape extending in the left-right direction. The pivot shaft 413 is inserted into the through-holes 22*b* formed in the support part 22B of the tail cover 22. With this configuration, the paddle lever 41 is configured to be pivotally movable in a clockwise direction in FIG. 11 about the pivot shaft 413 relative to the tail cover 22 when the operator presses the paddle lever 41 into the housing 2. In other words, the paddle lever 41 is movable in the up-down direction in order to drive and stop the motor 5. The pivot shaft 413 is an example of the "support shaft" of the present invention.

As illustrated in FIG. 2, the spring 411 is disposed between the paddle lever 41 and the outer circumferential surface of the tail cover 22. The spring 411 urges the paddle lever 41 to separate away from the tail cover 22. More specifically, the spring 411 urges the paddle lever 41 to be pivotally moved in a counterclockwise direction in FIG. 2 about the pivot shaft 413.

As illustrated in FIG. 2, the off-lock mechanism 412 includes an off-lock member 412A, and a spring 412B. The off-lock member 412A has a substantial plate shape extending in a direction orthogonal to an extending direction in which the paddle lever 41 extends when no external force is acting on the disc grinder 1. The off-lock member 412A has one end portion protruding downward from a lower surface of the paddle lever 41. The spring 412B is provided on the paddle lever 41 to pivotally move the off-lock member 412A in the counterclockwise direction in FIG. 2. Therefore, unless the operator pivotally moves the off-lock member 412A in a clockwise direction against the urging force of the spring 412B, another end portion of the off-lock member 412A contacts an outer circumference of the tail cover 22 when the paddle lever 41 is pressed into the housing 2, thereby preventing the paddle lever 41 from being further pressed into the housing 2. This configuration suppresses the disc grinder 1 from being driven unexpectedly. Further, since the protruding part 221 is provided on the rear portion of the tail cover 22 in the present embodiment, the disc grinder 1 can be even more suitably suppressed from being driven unintentionally. If the disc grinder 1 is dropped on the ground, for example, the protruding part 221 contacts the ground before the paddle lever 41 does.

Figure 9:
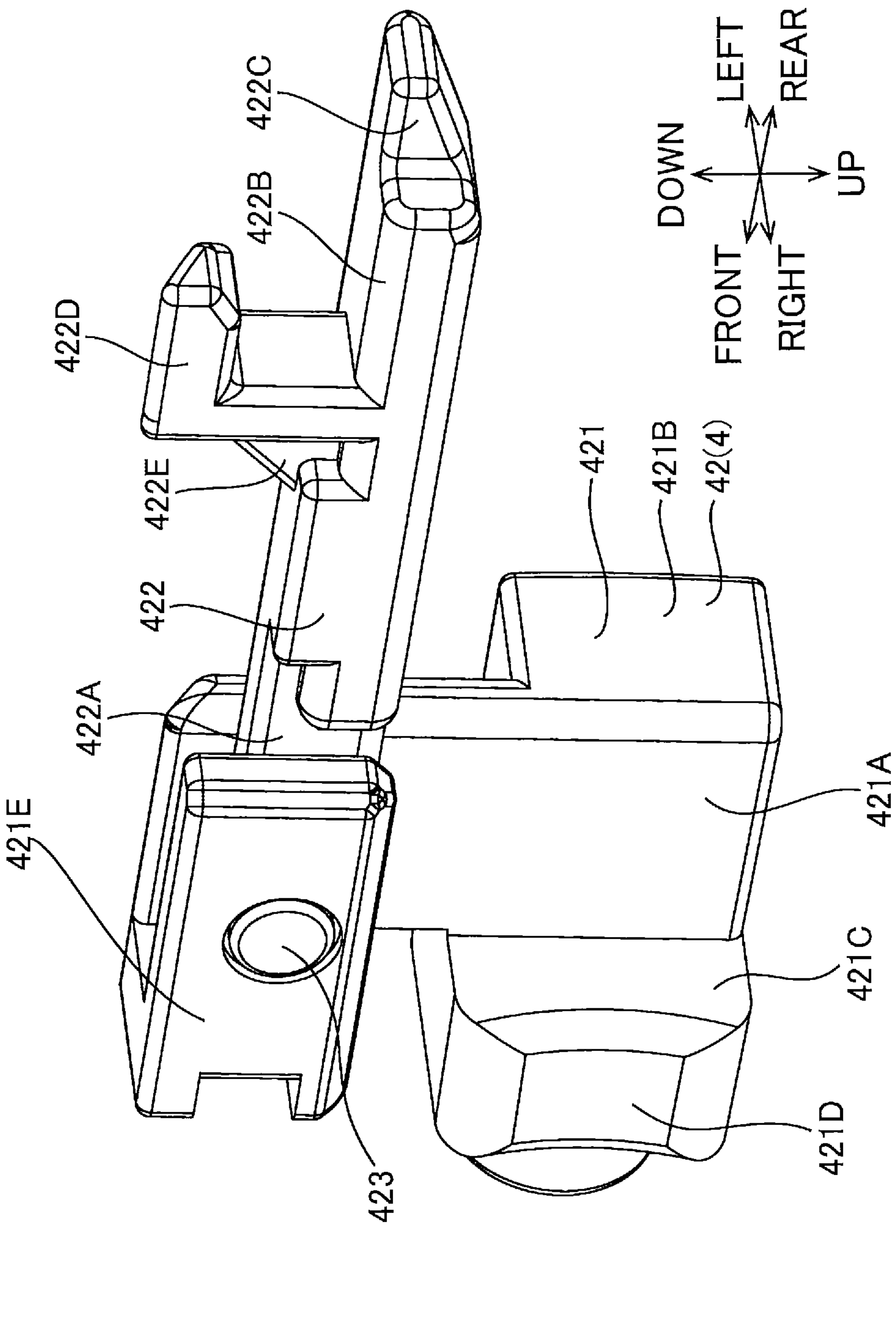
FIG. 9 is a perspective view illustrating the intervening part of the lever part in the disc grinder according to the first embodiment of the present invention.

As illustrated in FIG. 9, the intervening part 42 includes an attachment part 421, a lever 422, and a pin 423. The attachment part 421 includes a base part 421A, a first protrusion 421B, a second protrusion 421C, and a lever retaining part 421E. The attachment part 421 is attached to the motor housing 21, as will be described later. The intervening part 42 is an example of the "intervening part" of the present invention. The attachment part 421 is an example of the "support part" of the present invention.

The base part 421A has a substantial plate shape extending in the up-down direction. Although not illustrated in the drawings, a through-hole is formed in a lower portion of the base part 421A to penetrate the base part 421A in the left-right direction. The first protrusion 421B has a substantial block-like shape that protrudes leftward from an upper portion of the base part 421A. The second protrusion 421C is provided on a front portion of the base part 421A. The second protrusion 421C has a block-like shape that extends in the front-rear and left-right directions. The second protrusion 421C has a right surface having a curved surface 421D that is curved at a predetermined curvature.

The lever retaining part 421E is positioned at a lower portion of the attachment part 421, and has a substantial plate shape extending in the up-down and front-rear directions. A through-hole is formed in an approximate center portion in the front-rear direction of the lever retaining part 421E to penetrate the lever retaining part 421E in the left-right direction. The through-hole is positioned at the same position in the front-rear and up-down directions as the through-hole (not illustrated) formed in the lower portion of the base part 421A.

The lever 422 includes a lever base part 422A, a pressure-receiving part 422B, a notched part 422C, an engagement part 422D, and a reinforcing part 422E. The lever base part 422A has a substantial plate shape extending in the front-rear direction. Although not illustrated in the drawings, a through-hole is formed in a front portion of the lever base part 422A to penetrate the lever base part 422A in the left-right direction. This through-hole is positioned at the same position in the up-down and front-rear directions as the through-hole (not illustrated) formed in the lower portion of the base part 421A of the attachment part 421 and the through-hole formed in the lever retaining part 421E. By fitting the pin 423 into the through-holes formed in the lever base part 422A, the base part 421A, and the lever retaining part 421E in the present embodiment, the lever 422 is pivotally movable about the pin 423 relative to the attachment part 421. The lever 422 is an example of the "lever" of the present invention, and the pin 423 is an example of the "pivot shaft" of the present invention.

The pressure-receiving part 422B is positioned rearward of the lever base part 422A and extends in the front-rear direction. The pressure-receiving part 422B is formed to have a width in the left-right direction greater than that of the lever base part 422A. The pressure-receiving part 422B is configured so that the pressure-receiving part 422B can contact the pressing part 41A of the paddle lever 41. The lever 422 is movable between a release position illustrated in FIG. 11, and a pressed position illustrated in FIG. 12 in which the lever 422 is pressed by the paddle lever 41. The notched part 422C constitutes a rear end portion of the lever 422, and is recessed leftward to form a notched shape. The pressed position is an example of the "motor drive position" of the present invention, and the release position is an example of the "motor stop position" of the present invention.

The engagement part 422D is provided in an approximate center portion in the front-rear direction of the lever 422 and protrudes downward in an L-shape. The engagement part 422D is configured such that the engagement part 422D is engageable with the lever engaging part 41B of the paddle lever 41.

The reinforcing part 422E is provided to connect a lower surface of the lever base part 422A and a front surface of the engagement part 422D to each other. By providing the reinforcing part 422E, the engagement part 422D can be strengthened against forces applied for tilting the engagement part 422D frontward.

Figure 11:
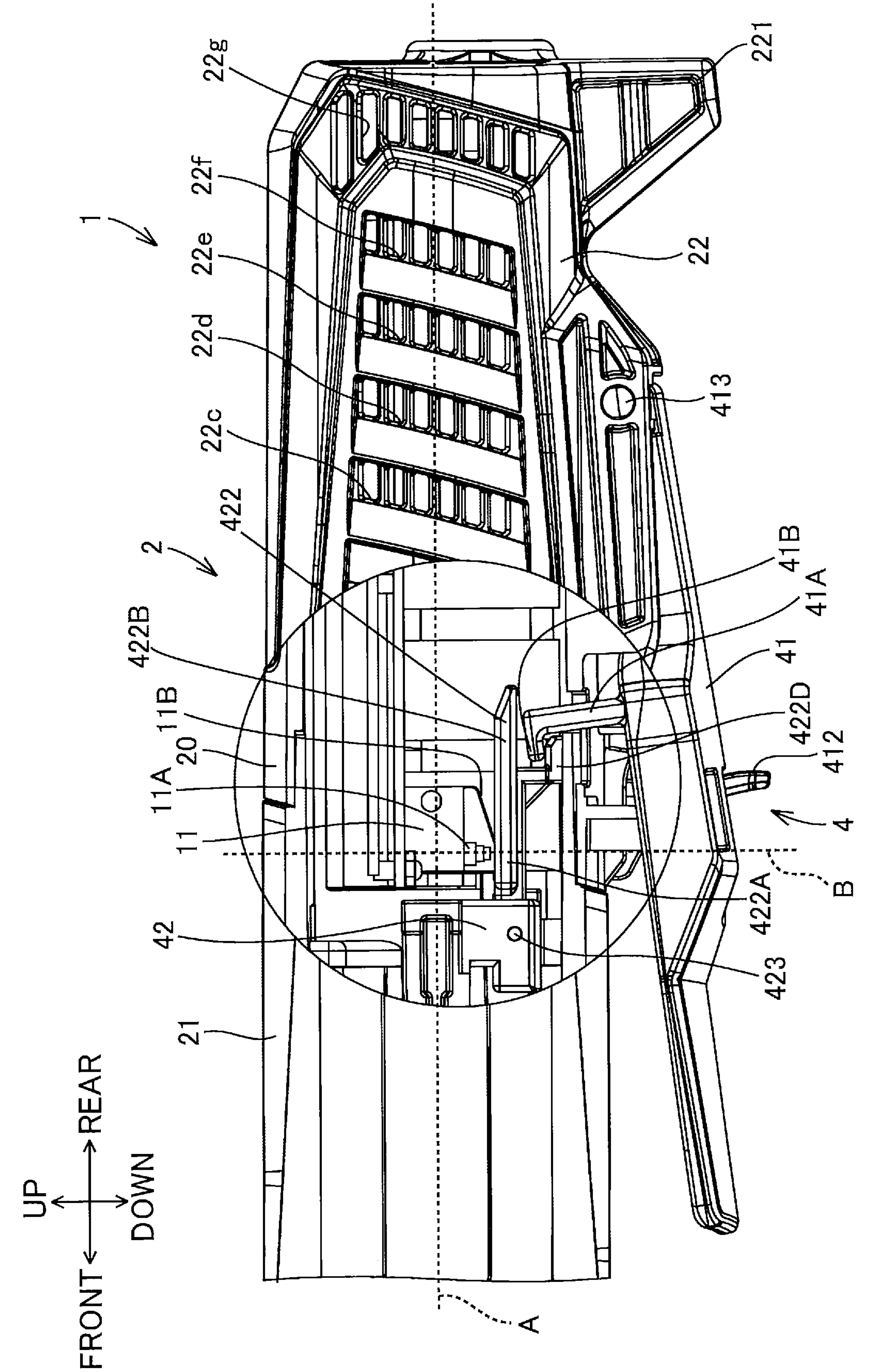
FIG. 11 is a partial cross-sectional view illustrating operation of the lever part in the disc grinder according to the first embodiment of the present invention, and illustrating a state where operations to a paddle lever by an operator is released.

As illustrated in FIG. 11, the electronic switch 11 is accommodated in the tail cover 22 and includes a switch plunger 11A, and a leaf spring 11B. The electronic switch 11 and the controller 10 are connected to each other through wiring for transmitting and receiving signals. The electronic switch 11 is a microswitch which is a small switch configured to detect slight movements using the switch plunger 11A and to transmit signals.

As illustrated in FIG. 11, the switch plunger 11A is provided at a position B with respect to a direction of an axis A of the gripping part 20, which spans over the motor housing 21 and the tail cover 22. The switch plunger 11A is configured to detect a position of the intervening part 42 relative to the housing 2. The axis A is an axis passing through an approximate center of the gripping part 20 and extending in the front-rear direction. The switch plunger 11A is configured to be capable of expanding and contracting when pressed upward relative to a body of the electronic switch 11. Specifically, by moving in the up-down direction, the switch plunger 11A is switchable between an OFF position (see FIG. 11) for driving the motor 5, and an ON position (see FIG. 12) for stopping the motor 5. In the present embodiment, a distance over which the switch plunger 11A is moved between the ON position and the OFF position is much shorter than a distance over which the paddle lever 41 is moved in the up-down direction when the operator presses the paddle lever 41 into the housing 2. That is, an amount by which the switch plunger 11A is allowed to be manipulated upward relative to the switch plunger 11A to turn on the switch plunger 11A is small compared to an amount by which the operator operates the paddle lever 41. In other words, an allowable amount of movement of the switch plunger 11A is smaller than a required amount of movement of the paddle lever 41. The switch plunger 11A is an example of the "switch" and the "detection part" of the present invention. The position B is an example of the "first position" and the "prescribed position" of the present invention. The up-down direction is an example of the "direction connecting the ON position and the OFF position to each other" of the present invention.

In the present embodiment, the electronic switch 11 transmits an ON signal to the controller 10 for driving the motor 5 when the switch plunger 11A detects that the intervening part 42 is at the pressed position and transmits an OFF signal to the controller 10 for stopping the motor 5 when the switch plunger 11A detects that the intervening part 42 is at the release position. The switch plunger 11A serves as an example of the detection part and may be configured of a magnetic sensor, a distance sensor, or the like that detects the position of the intervening part 42 and transmits signals to the controller 10. The controller 10 may be configured to determine that the intervening part 42 is at the release position when an ON signal is no longer outputted from the electronic switch 11, and vice versa. Thus, the controller 10 is configured to control the motor 5 based on signals from the electronic switch 11.

The leaf spring 11B is provided between a lower surface of the body of the electronic switch 11 and the lever base part 422A. The leaf spring 11B urges the lever 422 such that the switch plunger 11A and the lever 422 are positioned away from each other. Specifically, the leaf spring 11B urges the lever 422 to be pivotally moved in the clockwise direction in FIG. 11 about the pin 423.

As illustrated in FIG. 10, the intervening part 42 and the electronic switch 11 are arranged at positions in the housing 2 near a left side surface thereof. This arrangement prevents the intervening part 42 and the electronic switch 11 from blocking cooling air introduced through the intake port part 22A of the tail cover 22, thereby improving cooling efficiency for the motor 5 and the circuit elements and the like mounted on the circuit board part 6. Further, by providing the notched part 422C in the lever 422, contact of the intervening part 42 with the switching element Q2 can be prevented when the lever 422 is pivotally moved in the up-down direction, even when the provided switching elements are relatively large.

The intervening part 42 and the inverter circuit 96 are arranged at the same position in the front-rear direction. With this arrangement, the intervening part 42 is not positioned upstream of the inverter circuit 96 along a path of cooling air when the path extends in the front-rear direction, as in the present embodiment. Therefore, the intervening part 42 does not block cooling air on the upstream side of the inverter circuit 96, thereby improving cooling efficiency for the inverter circuit 96.

As illustrated in FIG. 8, an intervening unit holding part 212 for holding the attachment part 421 of the intervening part 42 is provided inside the motor housing 21. The intervening unit holding part 212 includes a pair of upper and lower rail parts 212A and 212B, a pair of upper and lower wall parts 212C and 212D, and a cylindrical part 212E.

The pair of upper and lower rail parts 212A and 212B protrude inward in the radial direction of the motor housing 21 and extend in the front-rear direction. A distance between a lower surface of the rail part 212A and an upper surface of the rail part 212B is configured to grow smaller toward the front. The rail parts 212A and 212B are shaped so that the first protrusion 421B of the attachment part 421 in the intervening part 42 is slidingly movable therebetween.

Each of the pair of upper and lower wall parts 212C and 212D has a general plate shape that extends rightward from the corresponding one of the rail parts 212A and 212B. A distance between a lower surface of the wall part 212C and an upper surface of the wall part 212D is set equivalent to a width in the up-down direction of the second protrusion 421C in the attachment part 421.

The cylindrical part 212E is disposed radially inward in the motor housing 21. The cylindrical part 212E has a general hollow cylindrical shape elongated in the front-rear direction. As illustrated in FIG. 2, the cylindrical part 212E is a part into which the ball bearing 21A is fitted. The cylindrical part 212E has a left side surface having a curvature the same as that of the curved surface 421D of the second protrusion 421C.

As illustrated in FIG. 8, the configuration of the present embodiment enables the intervening part 42 to be attached to the motor housing 21 by fitting the second protrusion 421C between the lower surface of the wall part 212C, the upper surface of the wall part 212D, and the left side surface of the cylindrical part 212E while slidingly moving the first protrusion 421B relative to the pair of rail parts 212A and 212B.

Thus, in the present embodiment, there is no need to provide a configuration for supporting the intervening part 42 in the tail cover 22 since the intervening part 42 is supported by the motor housing 21 that accommodates the motor 5 therein. Therefore, when the electronic switch 11 is provided on the tail cover 22, as in the present embodiment, a space sufficient for accommodating the electronic switch 11 can easily be allocated in the tail cover 22.

Further, since the intervening part 42 is configured to be supported by the motor housing 21 by attaching the attachment part 421 to the motor housing 21, there is no need to provide a threaded boss for fastening the intervening part 42 to the cylindrical motor housing 21, thereby avoiding an increase in an external size of the motor housing 21.

Further, the intervening part 42 can be supported by the motor housing 21 through a simple configuration in which the attachment part 421 is retained in the intervening unit holding part 212.

Next, positional relationship among the paddle lever 41, the intervening part 42, and the electronic switch 11 will be described with reference to FIG. 11.

Figure 12:
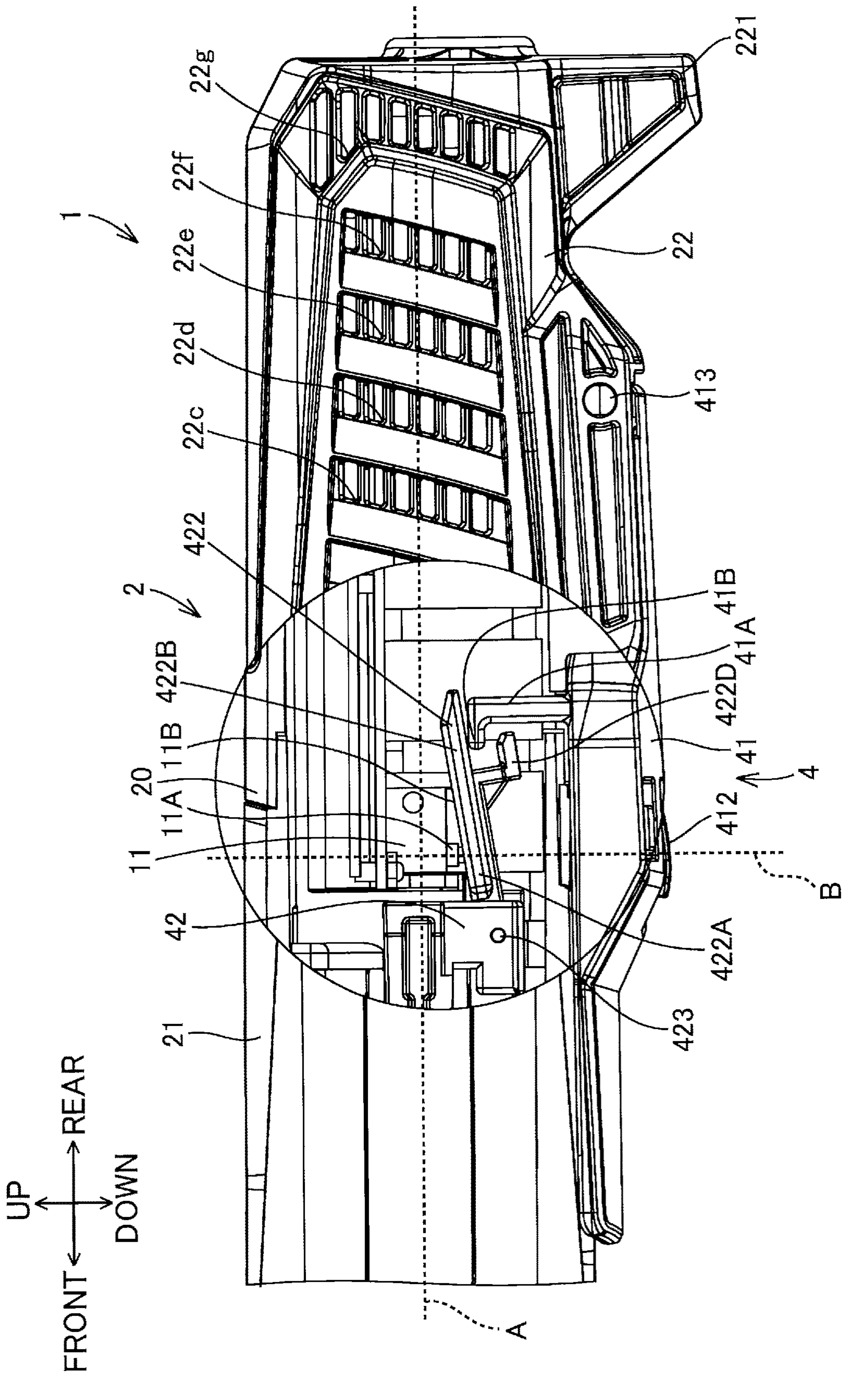
FIG. 12 is a partial cross-sectional view illustrating the operation of the lever part in the disc grinder according to the first embodiment of the present invention, and illustrating a state where the operator presses the paddle lever into the housing.

As illustrated in FIGS. 11 and 12, the switch plunger 11A is positioned at a position (the position B) in the direction of the axis A between the pin 423 and a point of contact between the pressing part 41A of the paddle lever 41 and the pressure-receiving part 422B of the lever 422 of the intervening part 42. Also, this point of contact is positioned between the position B and the pivot shaft 413 of the paddle lever 41. In other words, the pressing part 41A is positioned closer to the pivot shaft 413 than the switch plunger 11A is to the pivot shaft 413. As a result, the point of contact is positioned at a position separated from the switch plunger 11A in the direction of the axis A, and the switch plunger 11A is positioned between this point of contact and the pin 423. With this positional relationship, the switch plunger 11A can be pressed upward by a base end of the lever base part 422A of the lever 422, which is closer to the pin 423 and requires a smaller amount of movement (an amount of pivotal movement). The point of contact is an example of the "second position" of the present invention.

That is, the intervening part 42 can transmit movement to the switch plunger 11A with a smaller amount than the movement of the paddle lever 41 in the up-down direction passing through the position B. Hence, even when the paddle lever 41 is configured to be pivotally moved significantly relative to the housing 2 to give the operator the sense of pressing the paddle lever 41 inward, the switch plunger 11A need not be disposed on the farthest downstream end in a pivot path of the paddle lever 41, thereby securing freedom in arrangement for the electronic switch 11 in the housing 2.

Next, machining work performed on a workpiece using the disc grinder 1 according to the embodiment of the present invention, and operations of the disc grinder 1 during machining work will be described with reference to FIGS. 11 through 13.

In a state where the power cord 2A is connected to the commercial AC power supply Q, the operator first presses the paddle lever 41 into the housing 2. Specifically, the operator pivotally moves the off-lock mechanism 412 in the clockwise direction against the urging force of the spring 412B and presses the paddle lever 41 into the housing 2. Consequently, the paddle lever 41 is pivotally moved in the clockwise direction in FIG. 11 about the pivot shaft 413 relative to the tail cover 22.

In this state, as illustrated in FIG. 12, the pressing part 41A and the lever engaging part 41B of the paddle lever 41 contact the pressure-receiving part 422B of the lever 422 of the intervening part 42 and press the pressure-receiving part 422B upward. As a consequence, the lever 422 is pivotally moved in the counterclockwise direction in FIG. 11 about the pin 423. In this state, the base end on the lever base part 422A of the lever 422, which is closer to the pin 423 and requires a smaller amount of movement (an amount of pivotal movement), presses the switch plunger 11A of the electronic switch 11 upward. That is, the lever 422 presses the switch plunger 11A so that the switch plunger 11A is at the ON position.

At this time, electric power is supplied to the motor 5 via the power supply circuit 9, and the rotation shaft 51 begins rotating. As the rotation shaft 51 is rotated, the pinion gear 71 fixed to the rotation shaft 51 is also rotated coaxially. Since the gear teeth on the pinion gear 71 are meshingly engaged with the gear teeth on the bevel gear 72 in this state, the bevel gear 72 begins rotating in the clockwise direction in a plan view. While rotating, the bevel gear 72 reduces the rotational speed of the pinion gear 71.

The output shaft 81 fixed to the bevel gear 72 also begins rotating together with the bevel gear 72. Accordingly, grinding or other machining can be performed on a workpiece using the grinding wheel P attached to the output shaft 81.

When work is completed, the operator releases pressure on the paddle lever 41 into the housing 2, and the paddle lever 41 is pivotally moved in the counterclockwise direction in the drawings about the pivot shaft 413 by the urging force of the spring 411. At the same time, the lever 422 of the intervening part 42 is pivotally moved in the clockwise direction in the drawings about the pin 423 by the urging force of the leaf spring 11B in the electronic switch 11. As the lever 422 separates from the switch plunger 11A, pressure on the switch plunger 11A is released to allow the switch plunger 11A to be moved downward.

Figure 13:
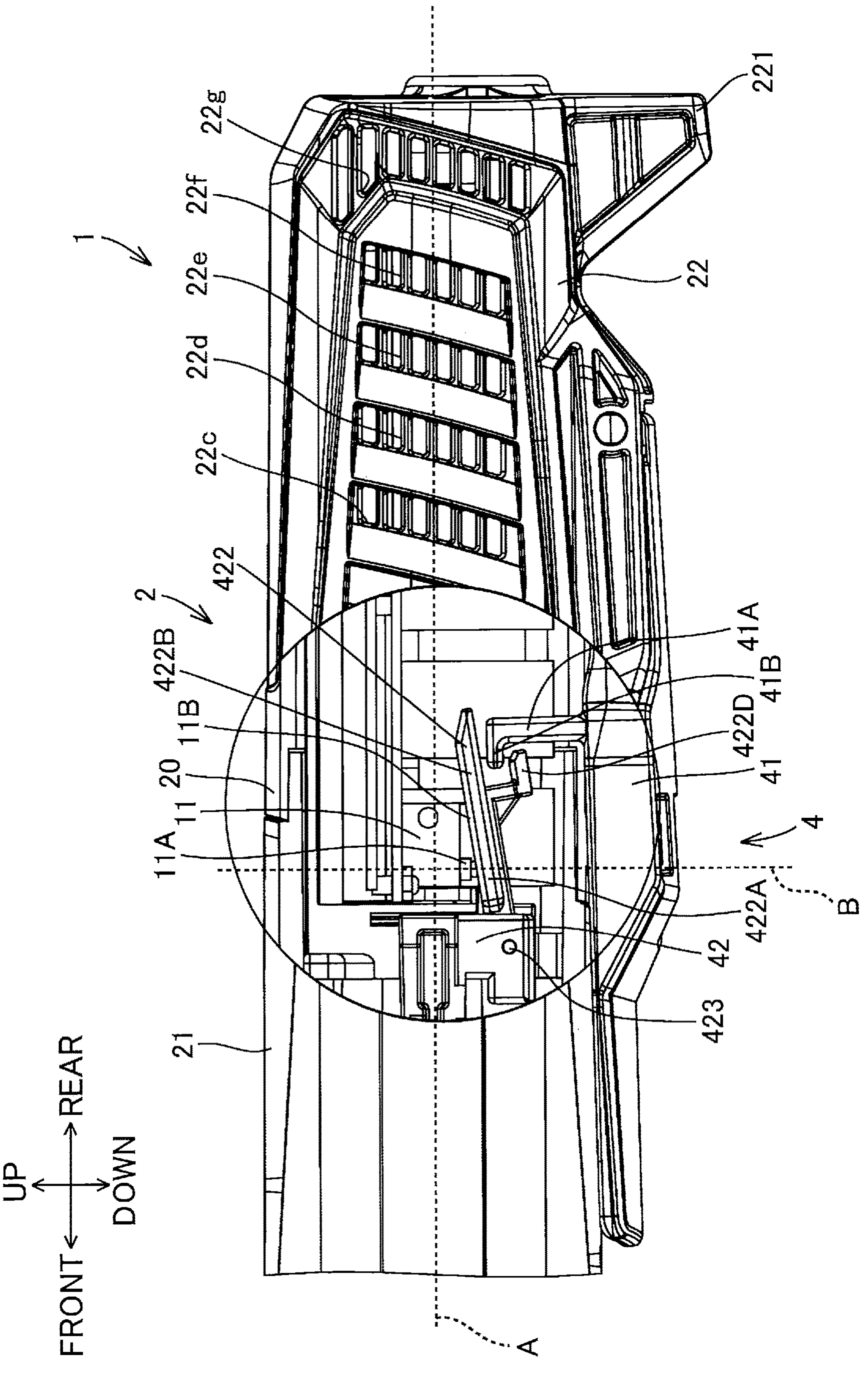
FIG. 13 is a partial cross-sectional view illustrating the operation of the lever part in the disc grinder according to the first embodiment of the present invention, and illustrating a state immediately after the operator releases pressure to the paddle lever into the housing.

Note that, due to deterioration of the leaf spring 11B, there is a possibility that the lever 422 is not returned to its original position and remains in a state illustrated in FIG. 13. However, in the present embodiment, the lever 422 can be returned to the position illustrated in FIG. 11 through the engagement between the lever engaging part 41B of the paddle lever 41 and the engagement part 422D of the lever 422. In other words, the urging force of the spring 411 disposed between the paddle lever 41 and the tail cover 22 can return the lever 422 to the position illustrated in FIG. 11. Thus, by transmitting the movement in the up-down direction of the paddle lever 41 to the lever 422, the lever 422 is movable from the pressed position illustrated in FIG. 12 to the release position illustrated in FIG. 11, thereby reliably stopping the motor 5.

In the embodiment described above, operation in a direction for driving the motor 5 and operation in a direction for stopping the motor 5 in the up-down direction of the paddle lever 41 are transmitted to the intervening part 42. This configuration can properly drive and stop the motor in response to operations by the operator on the paddle lever 41 when the electronic switch 11 is configured to be turned on and off through the intervening part 42, as in the present embodiment.

Further, the intervening part 42 is movable from the pressed position to the release position through a simple configuration in which the spring 411 is provided between the paddle lever 41 and the tail cover 22. The spring 411 is an example of the "urging member" and the "second urging member" of the present invention, and the leaf spring 11B is an example of the "first urging member" of the present invention.

Figure 15:
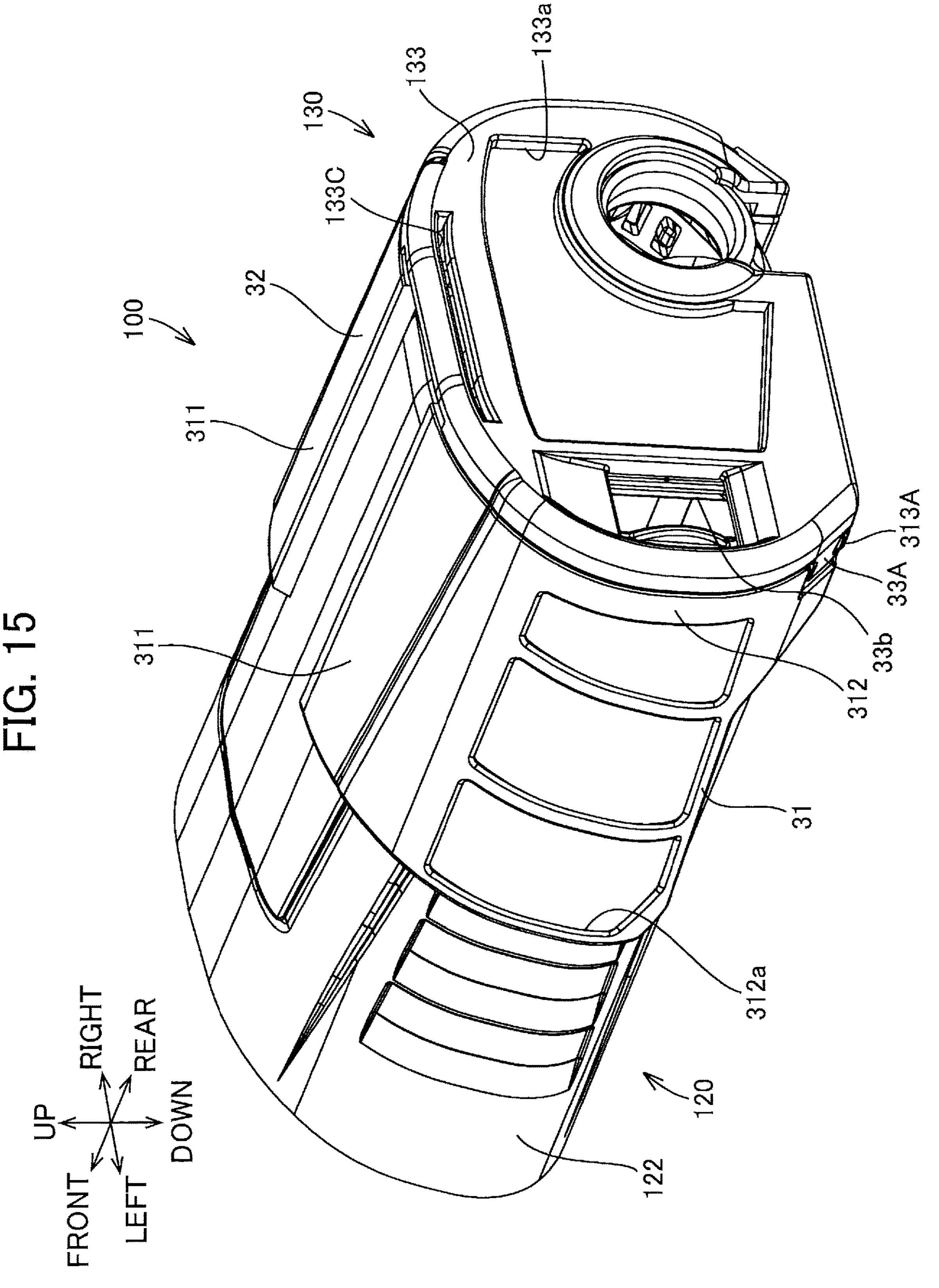
FIG. 15 is a perspective view illustrating a tail cover and a filter part of a disc grinder according to a second embodiment of the present invention as viewed from the approximate left and lower side thereof, and illustrating a state where the filter part is attached to the tail cover.

Next, a disc grinder 100 as an example of a work tool according to a second embodiment of the present invention will be described while referring to FIG. 15. The disc grinder 100 basically has a configuration identical to the disc grinder 1 according to the first embodiment and, thus, the configuration that differs therefrom will be mainly described. Configurations identical to those in the disc grinder 1 exhibit the same technical advantages described above.

The disc grinder 100 according to the second embodiment includes a housing 120 in place of the housing 2, and a filter part 130 in place of the filter part 3. The filter part 130 includes a left filter 31 and a right filter 32 configured similarly to the left filter 31 and the right filter 32 according to the first embodiment, and a rear filter 133 that differs from the rear filter 33 according to the first embodiment.

The housing 120 includes a tail cover 122. The tail cover 122 has a hollow cylindrical shape whose width in the left-right direction is greater. In other words, the tail cover 122 has a substantial elliptical shape in a rear side view. Although not illustrated in the drawings, a plurality of intake ports are formed in a left side surface, a right side surface, and a rear surface of the tail cover 122.

The rear filter 133 includes an upper engagement part 133C. The upper engagement part 133C is configured to be engageable with the upper engaging parts 31A of the left filter 31 and the right filter 32. Also, an opening 133*a* is formed in the rear filter 133. A fine metal mesh is provided in the opening 133*a*. The metal mesh is configured to restrain dust from entering through the intake ports formed in the rear surface of the tail cover 122 when the rear filter 133 is attached to the tail cover 122.

As described above, both the filter part 3 described in the first embodiment and the filter part 130 described in the second embodiment are configured of filters divided into three parts. Therefore, shapes of the left filter 31 and the right filter 32 need not be modified when the shape of the tail cover is changed, as in the second embodiment. The left filter 31 and the right filter 32 can be detachably attached to housings of various shapes simply by modifying a shape of the rear filter connecting the left filter 31 and the right filter 32 to each other. Accordingly, costs can be reduced by using common parts (the left filter 31 and the right filter 32).

While the disc grinder 1 is described as an example of a work tool in the present embodiments, the present invention can also be applied to work tools that are driven by motors other than the disc grinders.

REFERENCE SIGNS LIST

1: disc grinder, 2: housing, 3: filter part, 4: lever part, 5: motor, 6: circuit board part, 7: power transmission part, 8: output part, 9: power supply circuit, 10: controller, 11: electronic switch

The invention claimed is:

1. A work tool comprising:

a motor;

a housing accommodating therein the motor, the housing comprising a gripping part that can be gripped by an operator, the gripping part extending in a prescribed direction of the work tool;

an electronic switch, the switch being provided at the housing at a first position in the prescribed direction, the switch being switchable between an ON position for driving the motor and an OFF position for stopping the motor, a direction connecting the ON position and the OFF position to each other being a crossing direction crossing the prescribed direction;

a controller controlling the motor on a basis of a signal from the switch;

an operating part provided at the gripping part, the operating part being movable in the crossing direction in order to drive and stop the motor, a position of the operating part being changeable between an ON operation position for switching the switch to the ON position and an OFF operation position for switching the switch to the OFF position; and an intervening part movably intervened between the operating part and the switch to transmit movement of the operating part to the switch, a position of the intervening part being changeable between a pressed position for switching the switch to the ON position and a release position for switching the switch to the OFF position, wherein:

a part of the operating part and a part of the intervening part are positioned at the first position in the prescribed direction, and a moving amount in the crossing direction of the intervening part moving from the release position to the pressed position and passing through the first position is smaller than a moving amount in the crossing direction of the operating part moving from the OFF operation position to the ON operation position and passing through the first position.

2. The work tool according to claim 1, wherein the intervening part comprises:

a lever; and a pivot shaft supported by the housing and supporting the lever such that the lever is pivotally movable relative to the housing, wherein movement of the operating part is transmitted to the lever by contact of the operating part with the lever at a second position in the prescribed direction, and wherein the first position is positioned between the second position and the pivot shaft.

3. The work tool according to claim 2,
wherein the operating part comprises a support shaft rotatably supported by the housing, the operating part being configured to be pivotally movable about the support shaft, and
wherein the second position is positioned between the first position and the support shaft in the prescribed direction.

4. The work tool according to claim 1,
wherein the intervening part is configured to be movable between a pressed position where the intervening part presses the switch such that the switch is at an ON position and a release position where the intervening part is positioned away from the switch,
wherein the intervening part at the pressed position presses the switch such that the switch is at an open position,
wherein the intervening part at the release position is positioned away from the switch, and
wherein the intervening part is configured to be moved from the pressed position to the release position upon transmission of movement in the crossing direction of the operating part from the ON operation position to the OFF operation position.

5. The work tool according to claim 4,
wherein the intervening part and the operating part are configured to be engageable with each other, and
wherein operation in a direction for driving the motor and operation in a direction for stopping the motor in the crossing direction of the operating part are configured to be transmitted to the intervening part.

6. The work tool according to claim 4,
wherein an urging member is provided between the operating part and the housing to urge the operating part such that the intervening part is moved from the pressed position to the release position.

7. The work tool according to claim 4, further comprising:
a first urging member provided between the intervening part and the switch to urge the intervening part to be moved from the pressed position to the release position; and
a second urging member provided between the operating part and the housing to urge the operating part,
wherein the intervening part is configured to be moved to the release position in accordance with movement of the operating part caused by application of an urging force by the second urging member.

8. The work tool according to claim 1,
wherein the housing comprises:
a motor housing accommodating therein the motor; and
a rear housing accommodating therein the switch, and
wherein the operating part is supported by the rear housing, and the intervening part is supported by the motor housing.

9. The work tool according to claim 8,
wherein the motor housing is formed through integral molding to have a cylindrical shape,
wherein the intervening part comprises:
a lever;
a pivot shaft supported by the housing and supporting the lever such that the lever is pivotally movable relative to the housing; and
a support part supporting the lever and the pivot shaft, and
wherein the intervening part is supported by the motor housing by attachment of the support part to the motor housing.

10. The work tool according to claim 9,
wherein the motor comprises a rotation axis,
wherein a holding part is provided at the motor housing, the holding part being positioned inside the motor housing and holding a bearing supporting the rotation axis, and
wherein the support part is held by the holding part.

11. The work tool according to claim 8,
wherein an intake port through which air for cooling the controller is introduced is formed in the rear housing, and
wherein the switch and the intervening part are disposed at positions close to an inner surface of the rear housing.

12. The work tool according to claim 11,
wherein the controller comprises an inverter circuit comprising a plurality of switching elements for controlling the motor, and
wherein the intervening part and the inverter circuit are positioned at same positions as each other in the prescribed direction.

13. A work tool comprising:
a motor rotatable about an axis extending in a front-rear direction of the work tool;
a housing accommodating therein the motor;
a switch switchable between an ON position for driving the motor and an OFF position for stopping the motor;
an operating part comprising a support shaft supported by the housing, at a position further toward one side in the front-rear direction relative to the switch, the operating part being pivotally movable relative to the housing about the support shaft in a first pivot direction; and
an intervening part intervened between the operating part and the switch, the intervening part comprising a pivot shaft supported by the housing, the intervening part being pivotally movable relative to the housing about the pivot shaft in a second pivot direction opposite the pivot first direction, the intervening part being capable of pressing the switch by pivotal movement of the intervening part in the second pivot direction,
wherein the operating part is configured to be operated at a position further toward another side in the front-rear direction relative to the switch, the operating part comprising a contact part positioned closer to the support shaft than the switch is to the support shaft and capable of contacting the intervening part, the intervening part causing the switch to be moved to the ON position by the contact part pressing the intervening part in accordance with pivotal movement of the operating part.

14. The work tool according to claim 13,
wherein the operating part is configured to be operated at a position further toward the another side in the front-rear direction relative to the pivot shaft.

15. A work tool comprising:
a motor;
a housing accommodating therein the motor, the housing comprising a gripping part that can be gripped by an operator, the gripping part extending in a prescribed direction of the work tool;
a switch switchable between an ON position for driving the motor and an OFF position for stopping the motor, a direction connecting the ON position and the OFF position to each other being a crossing direction crossing the prescribed direction;

an operating part provided at the gripping part, the operating part being movable in the crossing direction between an ON operation position for driving the motor and an OFF operation position for stopping the motor; and an intervening part movably intervened between the operating part and the switch, wherein the intervening part is configured to be movable between a pressed position where the intervening part presses the switch such that the switch is at the ON position and a release position where the intervening part is positioned away from the switch, the intervening part being configured to be moved from the pressed position to the release position by receiving a force from the operating part moving from the ON operation position to the OFF operation position upon transmission of movement in the crossing direction of the operating part to the intervening part.

16. The work tool according to claim 15, wherein the operating part comprises an engaging part, wherein the intervening part comprises an engagement part, and wherein the engaging part and the engagement part are engageable with each other in the crossing direction, and wherein the intervening part is urged by the engaging part in a direction away from the switch.

17. The work tool according to claim 16, wherein the operating part comprises:

a main part; and a pressing part protruding from the main part in the crossing direction so as to urge the intervening part in a direction toward the switch, wherein the engaging part protrudes from the pressing part in the prescribed direction, and wherein the engagement part protrudes toward the pressing part so that the engagement part is engageable with the engaging part.

* * * * *